(12) United States Patent
Kuriya et al.

(10) Patent No.: US 6,621,421 B2
(45) Date of Patent: Sep. 16, 2003

(54) VEHICLE BACKWARD MOVEMENT ASSISTING APPARATUS FOR IN-LINE PARKING

(75) Inventors: Hisashi Kuriya, Aichi-ken (JP); Masahiko Ando, Aichi-ken (JP); Kazunori Shimazaki, Aichi-ken (JP); Isao Suzuki, Aichi-ken (JP); Koji Hika, Aichi-ken (JP)

(73) Assignee: Kabushiki Kaisha Toyoda Jidoshokki Seisakusho, Kariya (JP)

(*) Notice: Subject to any disclaimer, the term of this patent is extended or adjusted under 35 U.S.C. 154(b) by 367 days.

(21) Appl. No.: 09/789,895

(22) Filed: Feb. 21, 2001

(65) Prior Publication Data

US 2001/0017591 A1 Aug. 30, 2001

(30) Foreign Application Priority Data

Feb. 29, 2000 (JP) .......................... 2000-053465
Sep. 18, 2000 (JP) .......................... 2000-281472

(51) Int. Cl.⁷ ................................................ G08G 1/14
(52) U.S. Cl. .................... 340/932.2; 340/435; 340/436; 340/903; 348/118; 348/148; 180/204; 701/1; 701/41; 318/580; 318/587
(58) Field of Search ............................. 340/932.2, 903, 340/436, 435; 348/148, 140, 118, 139, 135; 701/1, 41; 180/204; 318/587, 580

(56) References Cited

U.S. PATENT DOCUMENTS

| 5,742,141 | A | * | 4/1998 | Czekaj ........................ 318/587 |
| 5,931,253 | A | * | 8/1999 | Shimizu et al. ............... 180/204 |
| 6,411,867 | B1 | * | 6/2002 | Sakiyama et al. ............. 701/1 |
| 6,476,730 | B2 | * | 11/2002 | Kakinami et al. ........ 340/932.2 |
| 6,476,731 | B1 | * | 11/2002 | Miki et al. ................... 340/937 |
| 6,483,429 | B1 | * | 11/2002 | Yasui et al. .................. 340/435 |
| 6,483,442 | B2 | * | 11/2002 | Shimizu et al. ........... 340/932.2 |
| 6,487,481 | B2 | * | 11/2002 | Tanaka et al. ................. 701/41 |

FOREIGN PATENT DOCUMENTS

| EP | 1 022 903 A2 | 7/2000 | ............ H04N/7/18 |
| JP | 2-36417 | 8/1990 | ............. B60R/1/00 |
| JP | 10-244891 | 9/1998 | ............ B60R/21/00 |
| WO | WO 01/12472 A1 | 2/2001 | ............ B60R/21/00 |

* cited by examiner

Primary Examiner—Nina Tong
(74) Attorney, Agent, or Firm—Morgan & Finnegan, LLP

(57) ABSTRACT

In a vehicle backward movement assisting apparatus for in-line parking, at a stop position of a vehicle, a seesaw switch is manipulated until an in-line guide line is superimposed on a target point which is a corner of a frame of a parking space, and a steering wheel is turned until the vehicle space mark is superimposed on the parking space, and the vehicle is moved backward while the steering angle of the steering wheel is held. When an eye mark is superimposed on the parking space, the vehicle is stopped, and the steering angle of the steering wheel is made maximum and the vehicle is moved backward, to thereby complete the in-line parking at the parking space.

12 Claims, 17 Drawing Sheets

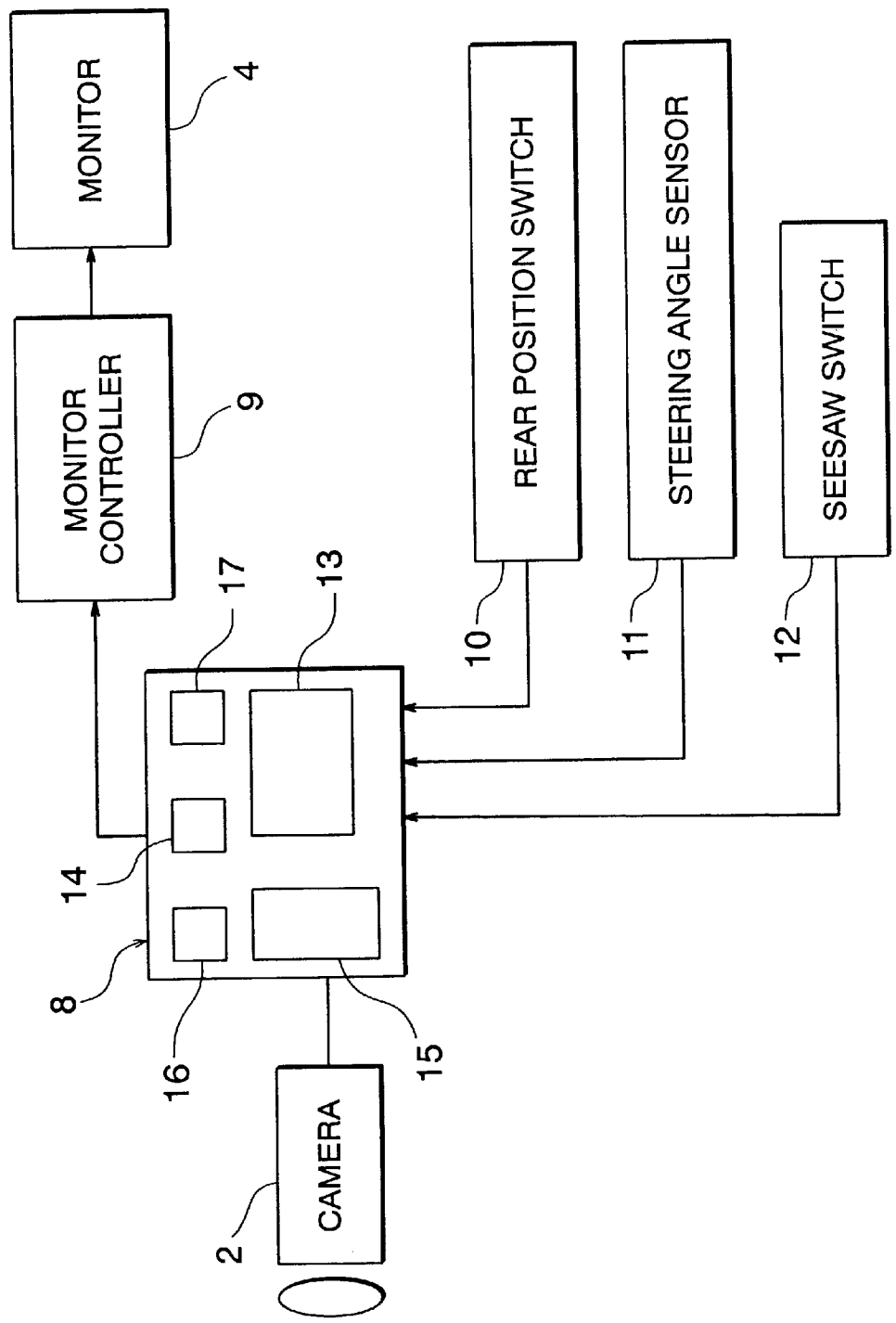

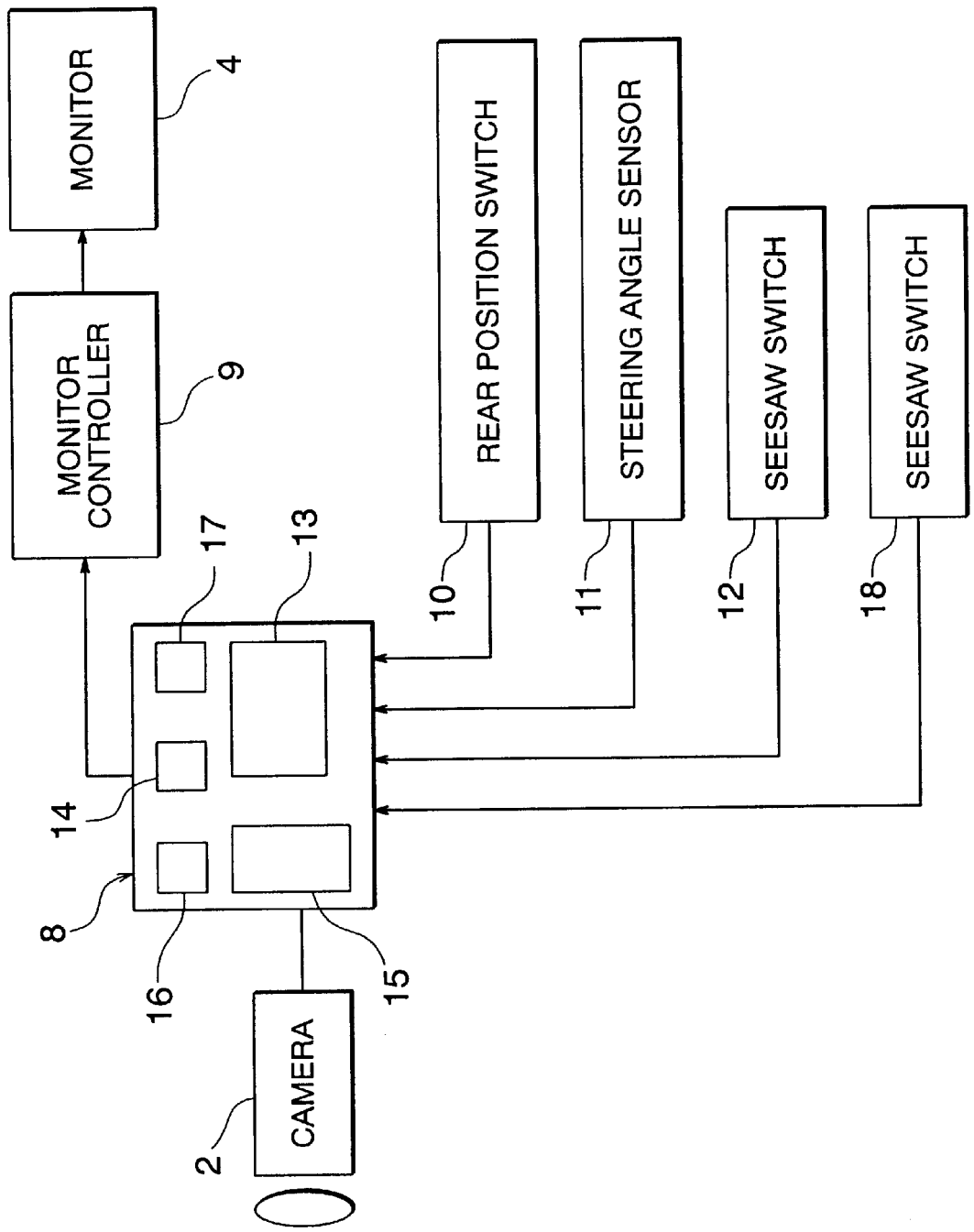

VEHICLE BACKWARD MOVEMENT ASSISTING APPARATUS FOR IN-LINE PARKING

BACKGROUND OF THE INVENTION

1. Field of the Invention

The present invention relates to a vehicle backward movement assisting apparatus for in-line parking, and more particularly to a device for superimposedly displaying indication for assisting the steering wheel operation during in-line parking operation on a monitor screen on which a rear view of a vehicle is imaged.

2. Description of the Related Art

Conventionally, an apparatus has been proposed which displays a rear side view of a vehicle on a monitor in the case where the target place is out of sight from a driver due to the dead angle of the vehicle when the vehicle reverses. For example, Japanese Patent Examined Publication No. 2-36417 discloses a rear view monitoring apparatus for a vehicle which comprises a television camera for picking up a rear view of the vehicle, a monitor television set for imaging an image picked up by the camera, a sensor for outputting an information signal related to a tire steering angle and a circuit for generating a marker signal in response to the information signal from this sensor and superimposing the marker on the television image field. In this apparatus, the tire steering angle data and the marker position data along the reverse direction of the vehicle corresponding to its steering angle are stored in a ROM, and a predicted reverse locus of the vehicle in correspondence with the steering angle at that time is superimposed and displayed on the image picked up by the television camera on the television view field as a row of the markers.

According to such an apparatus, since the predicted reverse locus of the vehicle in correspondence with the steering angle together with the view field of the conditions of the road on the rear side is shown on the image field of the monitor television when the vehicle reverses, the driver may reverse the vehicle by manipulating the steering wheel while watching the television image field without looking back.

In the case where the vehicle is to be parked in line, for example, the vehicle is reversed in parallel with a road, the vehicle is entered into a parking space by operating the steering wheel at a suitable position, and the vehicle is guided into the target parking position by turning the steering wheel in the reverse direction. However, in the conventional rear view monitoring apparatus, only with the driver viewing the predicted reverse locus of the vehicle and the rear view field on the television image field, it is difficult for the driver to judge where the steering wheel should start to be operated, where the steering wheel should be turned and how much the steering wheel steering amount should be selected. Thus, it is impossible to sufficiently assist the driver for the suitable in-line parking in the conventional rear view monitoring apparatus.

SUMMARY OF THE INVENTION

The present invention has been made to solve the above problem with the prior art, and therefore an object of the present invention is to provide a vehicle backward movement assisting apparatus for in-line parking operation which is capable of readily grasping a steering timing and a steering amount when a driver conducts an in-line parking.

According to the present invention, there is provided a vehicle backward movement assisting apparatus for in-line parking comprising: a camera for picking up an image of the rear of a vehicle; a monitor disposed in a driver's seat of the vehicle, an in-line guide line movement switch disposed in the driver's seat of the vehicle; a steering angle sensor for detecting a steering angle of a steering wheel; and display control means for, when the vehicle runs backward, displaying on the monitor an image obtained by the camera and for displaying a guide display for assisting the drive of the vehicle in the in-line parking operation on a screen of the monitor in a superimposing manner, the guide display including: at least one in-line guide line displayed movavly on the screen of the monitor in accordance with the manipulation of the in-line guide line movement switch; a vehicle space mark displayed movavly along the in-line guide line of the screen of the monitor in accordance with the steering angle of the steering wheel detected by the steering angle sensor; and an eye mark fixedly displayed at a given position of the screen of the monitor for guiding an opposite turn point of the steering wheel.

The image of the rear of the vehicle picked up by the camera when the vehicle runs backward is displayed on the monitor, and the in-line guide line, the vehicle space mark and the eye mark are displayed on the screen of the monitor as the guide display of the monitor during the in-line parking operation in a superimposing manner. A driver grasps the steering angle corresponding to a first turn in in-line parking on the basis of the in-line guide line displayed movably on the screen of the monitor by the manipulation of the in-line guide line movement switch and the vehicle space mark displayed movably along the in-line guide line on the screen of the monitor in accordance with the steering angle of the steering wheel detected by the steering angle sensor. The driver also grasps the opposite turn point of the steering wheel for a second turn on the basis of the eye mark.

BRIEF DESCRIPTION OF THE DRAWINGS

FIG. 2 is a block diagram showing the structure of the vehicle backward movement assisting apparatus in accordance with a first embodiment;

FIG. 13 is a block diagram showing the structure of a vehicle backward movement assisting apparatus in accordance with a third embodiment;

DETAILED DESCRIPTION OF THE PREFERRED EMBODIMENTS

Now, a description will be given in more detail of preferred embodiments of the present invention with reference to the accompanying drawings.

First Embodiment

Figure 1:
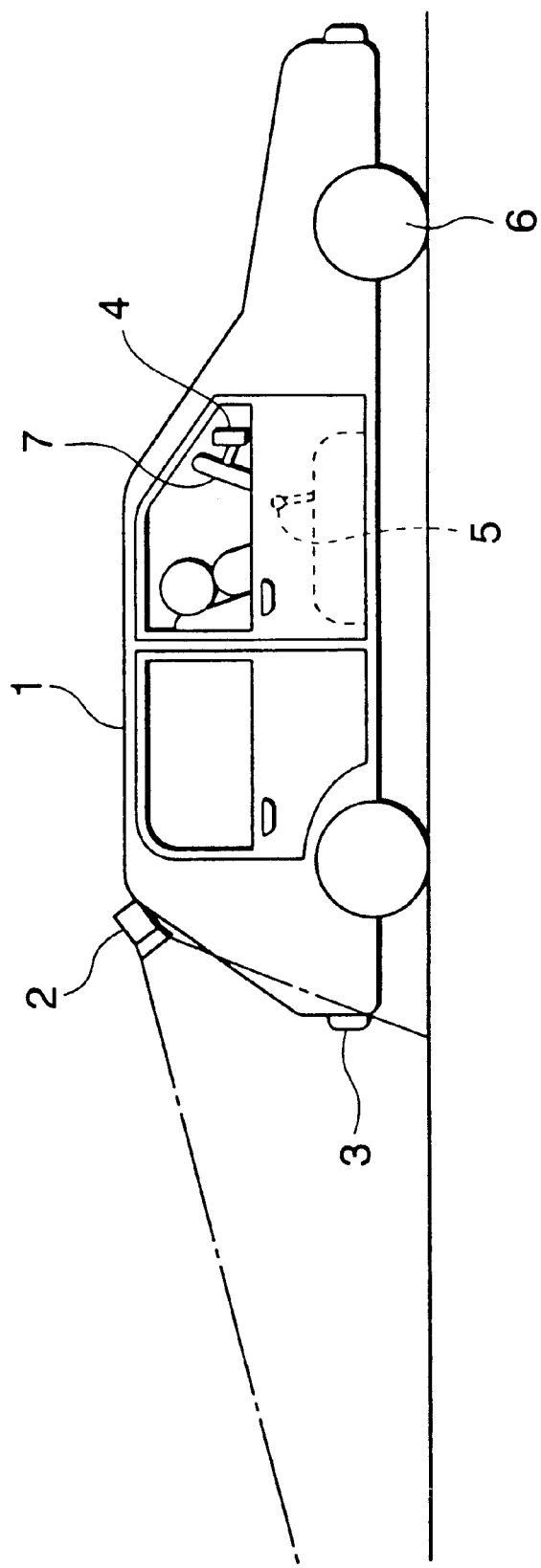
FIG. 1 is a side view showing a vehicle on which a vehicle backward movement assisting apparatus for in-line parking in accordance with the present invention is mounted.

As shown in FIG. 1, a camera 2 for picking up a rear view of a vehicle 1 is attached to the rear of the vehicle 1. A rear bumper 3 of the vehicle 1 is arranged in a proximate side end portion of a view field range of the camera 2. A monitor 4 comprising a liquid crystal display of a color type is arranged in a driver's seat of the vehicle 1, and is normally used as the display unit of a navigation device. When a shift lever 5 arranged in the driver's seat is operated and moved to a backing-up position, an image picked-up by the camera 2 is displayed. Front wheels 6 are driving wheels steered by the manipulation of the steering wheel 7.

FIG. 2 is a block diagram showing the structure of a vehicle backward movement assisting apparatus for in-line parking in accordance with a first embodiment of the present invention. In the figure, the camera 2 is connected with an image processing unit 8, and the image processing unit 8 is connected with the monitor 4 through a monitor controller 9. Also, the vehicle 1 is equipped with a rear position switch 10 for detecting whether the shift lever 5 is changed over to the backward position, and the steering shaft of a steering wheel 7 is equipped with a steering angle sensor 11 for detecting an steering angle θ of the steering wheel 7. Furthermore, disposed in the driver's seat is a seesaw switch 12 which is an in-line guide line movement switch for moving the in-line guide line on the monitor 4, which will be described later, and the rear position switch 10, the steering angle sensor 11 and the seesaw switch 12 are connected to the image processing unit 8, respectively.

The monitor controller 9 normally displays information based on a display signal from the navigation device (not shown) in the monitor 4. However, when a display signal from the image processing unit 8 is inputted to the controller 9, the controller 9 performs a display operation based on the display signal from the image processing unit 8 in the monitor 4.

The image processing unit 8 has a CPU 13, a ROM 14 storing a control program therein, a processor 15 for image processing which processes image data from the camera 2, an image memory 16 for storing the image data processed by the processor 15 for image processing, and a RAM 17 for working.

Display control means of the present invention is composed of such an image processing unit 8, the monitor controller 9, and the rear position switch 10.

Figure 3A:
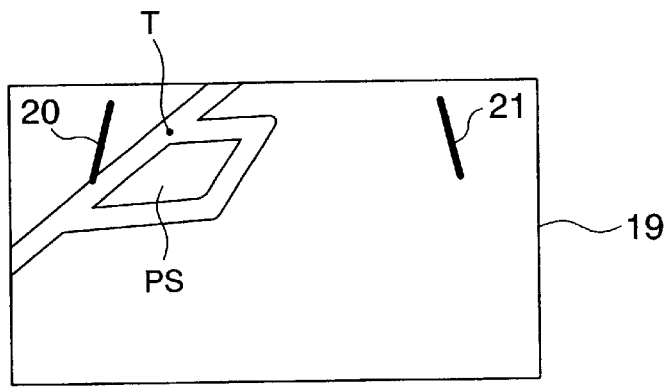
FIGS. 3A to 3D are views schematically showing, in a stepwise manner, a monitor screen when a vehicle is parked in line in accordance with the first embodiment.
Figure 3B:
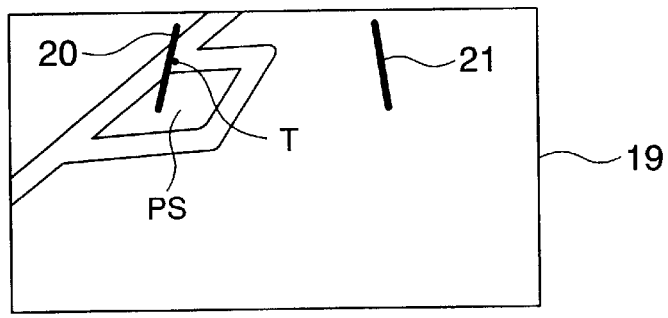

The CPU 13 operates on the basis of the control program stored in the ROM 14, and upon detection of entering an in-line parking mode by changing over the shift lever 5 to the backward position by the rear position switch 10, the CPU 13 produces display data in a given period for displaying a pair of in-line guide lines 20 and 21 disposed at the right and left sides of the upper portion within the screen 19 of the monitor 4 so as to be superimposed on an image of the camera 2, as shown in FIG. 3A. Those in-line guide lines 20 and 21 are movable toward the left and the right within the screen 19 of the monitor 4 by the manipulation of the seesaw switch 12 disposed in the driver's seat, as shown in FIG. 3B.

Figure 3C:
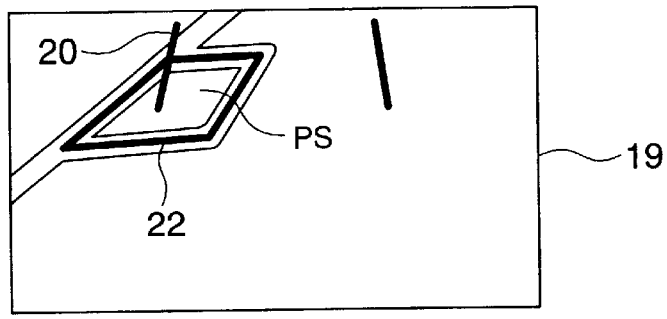

In addition, the CPU 13 produces display data in a given period for displaying a rectangular vehicle space mark 22 that moves along one of the in-line guide lines 20 and 21 of the screen 19 of the monitor 4 in accordance with the steering angle θ of the steering wheel 7 so as to be superimposed on the image of the camera 2 on the basis of an output signal of the steering angle sensor 11. For example, if the steering wheel 7 is turned to the right, the vehicle space mark 22 is displayed so as to move on the in-line guide line 20 at the left side of the screen as shown in FIG. 3C, whereas if the steering wheel 7 is turned to the left, the vehicle space mark 22 is displayed so as to move on the in-line guide line 21 at the right side of the screen.

Figure 3D:
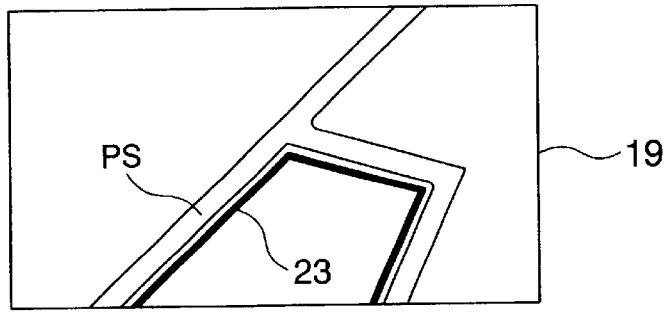

Also, the CPU 13 produces display data in a given period for displaying an eye mark 23 for notifying the driver of the return timing of the steering wheel 7 so as to be superimposed on the image of the camera 2 as shown in FIG. 3D. The eye mark 23 has such a configuration as to correspond to a predicted parking position when the vehicle 1 runs backward in a state where the steering wheel 7 is returned, and the CPU 13 notifies the driver that a position where the eye mark 23 is superimposed on a target parking space PS is the return position on the screen 19.

Figure 4:
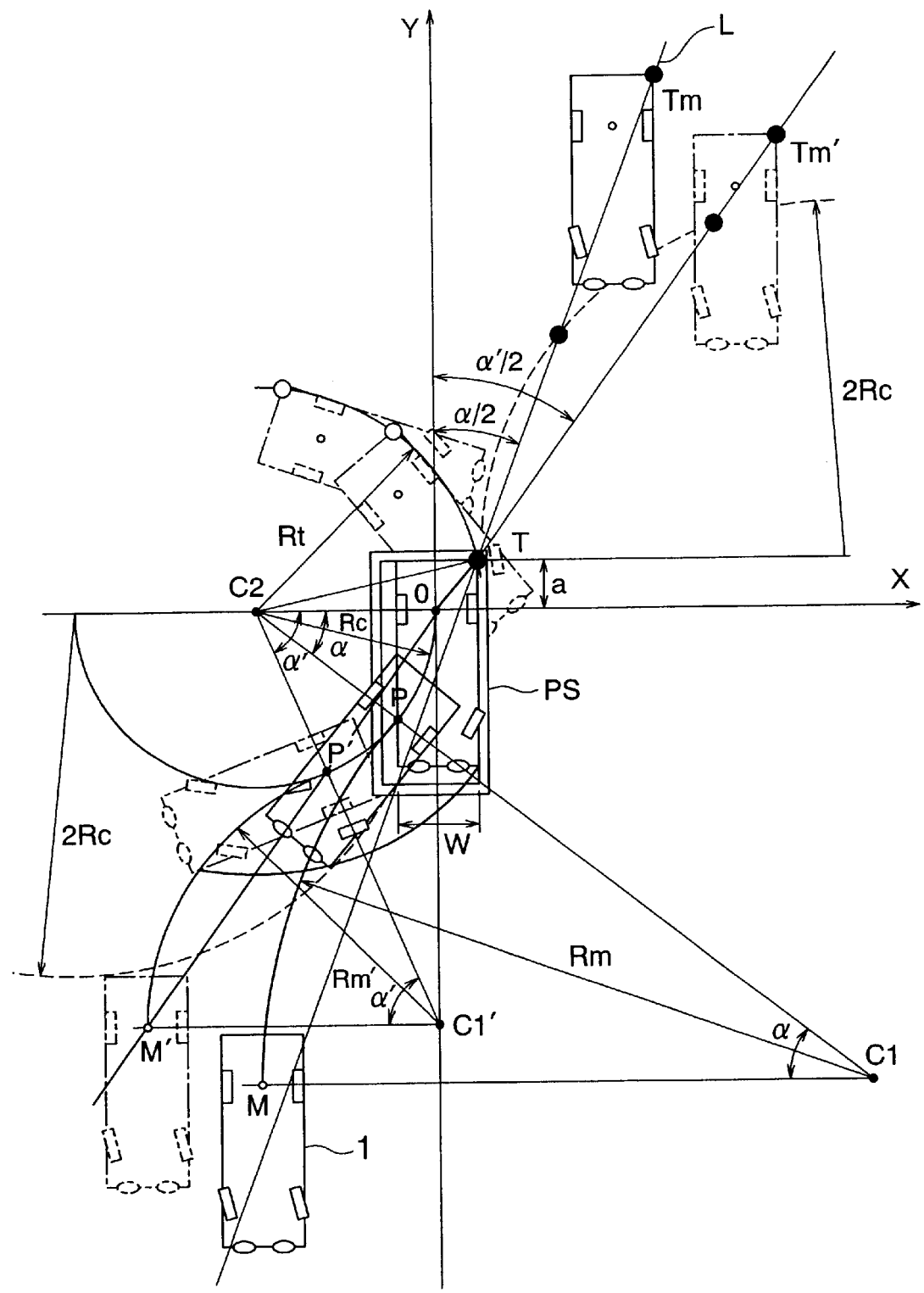
FIG. 4 is a diagram showing a method of drawing a guide display in accordance with the first embodiment.

A method of drawing the in-line guide lines 20 and 21, the vehicle space mark 22 and the eye mark 23 will now be described. As shown in FIG. 4, the center of a rear axle of the vehicle 1 in a state where the vehicle is appropriately parked at the parking space PS is set as the origin, a Y-axis is taken in parallel with a road and in the backward direction of the vehicle 1, and an X-axis is taken at a right angle with respect to the Y-axis. Also, it is assumed that the widthwise corner of the parking space PS is a target point T, and its coordinates are T (W/2, a), where W is a vehicle width and a is a rear overhang. The vehicle 1 which is at a vehicle position M runs backward while being turned at an angle α with a radius of R m with a point C1 as a center (first turn), and when the vehicle reaches a vehicle position P, the steering wheel 7 is turned in a counter direction so that the steering angle becomes maximum. In this state, the vehicle 1 is moved backward with a radius of Rc with a point C2 as a center (second turn), to thereby appropriately park the vehicle at the parking space PS.

First, a straight line L connecting the target point T of the parking space PS and the rear end point of the vehicle 1 at the vehicle position M corresponding to the target point T is represented by the following expression (1).

$$Y=\{\sin\alpha/(1-\cos\alpha)\}\cdot X-\{\sin\alpha/(1-\cos\alpha)\}\cdot(W/2)+a \quad (1)$$

The straight line L and a straight line symmetrical with the straight line L with respect to the Y-axis are drawn as the in-line guide lines 20 and 21, respectively. An appropriate initial value is given to draw the angle α so as to increase or decrease in accordance with the manipulation of the seesaw switch 12.

On the screen 19, the value of the angle α is changed in accordance with the manipulation of the seesaw switch 12, as a result of which the in-line guide lines 20 and 21 move toward the right and left sides. When those in-line guide lines 20 and 21 are superimposed on the target point T of the parking space PS, the angle α corresponding to the vehicle position M is obtained.

Assuming that K1, K2 and K3 are known coefficients, the radius R m of the first turn from the vehicle position M to the vehicle position P is obtained as follows through the steering angle θ of the steering wheel 7.

$$Rm=B/\tan(K1\cdot\theta^2+K2\cdot\theta+K3)$$

[B: a known coefficient]
As a result, in the case where the vehicle 1 at the vehicle position M is the origin, that is, the vehicle 1 is moved in parallel with the parking space PS, the coordinates (Tmx, Tmy) of the point Tm corresponding to the target point T of the parking space PS are represented as follows:

$$Tmx=(Rc+Rm)\cdot(1-\cos\alpha)+W/2$$

$$Tmy=(Rc+Rm)\cdot\sin\alpha+a$$

The vehicle space mark 22 can be drawn at the position corresponding to the steering angle θ with the point Tm as the rear end.

On the screen 19, the steering angle θ is changed in accordance with the manipulation of the steering wheel 7, as a result of which the vehicle space mark 22 is moved along the in-line guide lines 20 and 21 and then superimposed on the parking space PS, to thereby obtain an appropriate steering angle θ corresponding to the vehicle position M. In addition, the coordinates (Tmx, Tmy) of the radius Rm an the point Tm are obtained from the steering angle θ.

Then, a method of drawing the eye mark 23 will be described. The eye mark 23 can be regarded as the outer configuration of the vehicle 1 in a state where the vehicle 1 is appropriately parked at the parking space PS, which is viewed from the vehicle position P that is the return position of the steering wheel 7. Therefore, the vehicle 1 which is appropriately parked at the parking space PS is turned by the angle α with the center C2 of the second turn as a center and drawn as the eye mark 23.

In general, in the case where a point P (Xp, Yp) is turned by an angle β with a point C (Xc, Yc) as a center, a point P' (Xp', Yp') is represented by the following expressions:

$$Xp'=(Xp-Xc)\cdot\cos\beta+(Yp-Yc)\cdot\sin\beta+Xc$$

$$Yp'=-(Xp-Xc)\cdot\sin\beta+(Yp-Yc)\cdot\cos\beta+Yc$$

Therefore, the eye mark 23 shown in FIG. 3D can be drawn by using the coordinates C2 (−Rc, 0) of the center C2 and the angle α.

Next, an operation of the vehicle backward movement assisting apparatus during in-line parking will be described. First, the driver operates and moves the shift lever 5 to a backing-up position at the vehicle position N parallel with a road as shown in FIG. 4. Then based on a detecting signal from the rear position switch 10, the image processing unit 8 displays the pair of in-line guide lines 20 and 21 on the left and right upper portions of the screen 19 of the monitor 4 as shown in FIG. 3A, so that the lines are superposed on the image picked up by the camera 2.

At this point, the target point T of the parking space PS has not yet been superimposed on the in-line guide line 20 for left side rear parking.

When the driver manipulates the seesaw switch 12, the in-line guide lines 20 and 21 move toward the right and left sides on the screen 19, and as shown in FIG. 3B, when the in-line guide line 20 is superimposed on the target point T of the parking space PS, the manipulation of the seesaw switch 12 is completed.

When the steering wheel 7 is turned to the right, the vehicle space mark 22 gradually moves from the upper side toward the lower side along the in-line guide line 20 in accordance with the steering amount of the steering wheel 7. Then, as shown in FIG. 3C, when the vehicle space mark 22 is superimposed on the parking space PS, the vehicle 1 is moved backward while the steering angle θ of the steering wheel 7 is retained. As a result, the vehicle 1 is turned with the radius of Rm. In this situation, the driver can move back the vehicle 1 while ensuring the safety of the periphery of the vehicle with his eyes being averted from the screen 19.

When the first turn of from the vehicle position M to the vehicle position P starts, the CPU 13 completes the display of the in-line guide lines 20 and 21 and the vehicle space mark 22, and instead displays the eye mark 23 so as to be superimposed on the image of the camera 2. With the backward movement of the vehicle 1, the parking space PS gradually approaches the eye mark 23 on the screen 19. Then, as shown in FIG. 3D, when the parking space PS is superimposed on the eye mark 23, it is judged that the vehicle 1 reaches the vehicle position P, and the vehicle 1 is stopped.

Then, the steering angle of the steering wheel 7 is made maximum in the counter direction during a static turn, and in this state, the vehicle 1 is moved backward. In this state, the driver can move the vehicle 1 backward while ensuring the safety of the periphery of the vehicle 1 with his eyes being averted from the screen 19. As a result, the vehicle 1 appropriately enters the parking space PS. When the driver recognizes a gap between the vehicle and a rear substance, or when the side portion of the vehicle 1 becomes in parallel with a road side, the driver stops the vehicle 1 and completes the in-line parking.

As described above, in the first embodiment, the in-line guide lines 20 and 21 are superimposed on the target point T of the parking space PS on the screen 19 by the manipulation of the seesaw switch 12 in a state where the vehicle 1 stops at the vehicle position M which is in parallel with the road side, and the vehicle space mark 22 is superimposed on the parking space PS by the manipulation of the steering wheel 7, to thereby obtain the turning angle α, the turning radius Rm and the vehicle position P of the first turning. For example, in FIG. 4, in the case where the vehicle 1 stops at the vehicle position M' which is in parallel with the road side, the turning angle α', the turning radius Rm' and the vehicle position P' are obtained in the same manner, and the in-line parking at the parking space PS can be conducted by the same manipulation.

Because the position where the vehicle 1 stops in parallel with the road side becomes a start point of the first turning, for example, in the case where the vehicle 1 is close to a side of another vehicle which has been already parked and stops in a state where the vehicle 1 goes forward too far, there is a fear that the vehicle 1 interferes with another vehicle which has been parked when the vehicle 1 conducts the first turn. Also, in the case where the vehicle 1 is apart from the road side and stops in front of the road side, even if the steering wheel 7 is fully turned, there is a fear that the vehicle 1 cannot park at the target parking space PS. Further, in the case where the vehicle parks at a position farther from the target parking space PS than a required position, because an image of the parking space PS on the screen 19 becomes small, it is difficult to superimpose the in-line guide lines 20 and 21 on the target point T, thereby deteriorating the parking precision.

Taking the above into consideration, a region decided by four conditions consisting of 1) the prevention of interference at the first turn, 2) the avoidance of an unable-to-park region, 3) a limit of a remote distance in an X-direction, and 4) a limit of a remote distance in a Y-direction, is set as an initial parking area where the vehicle 1 can be parked.

1) The Prevention of Interference of the First Turn

Figure 5:
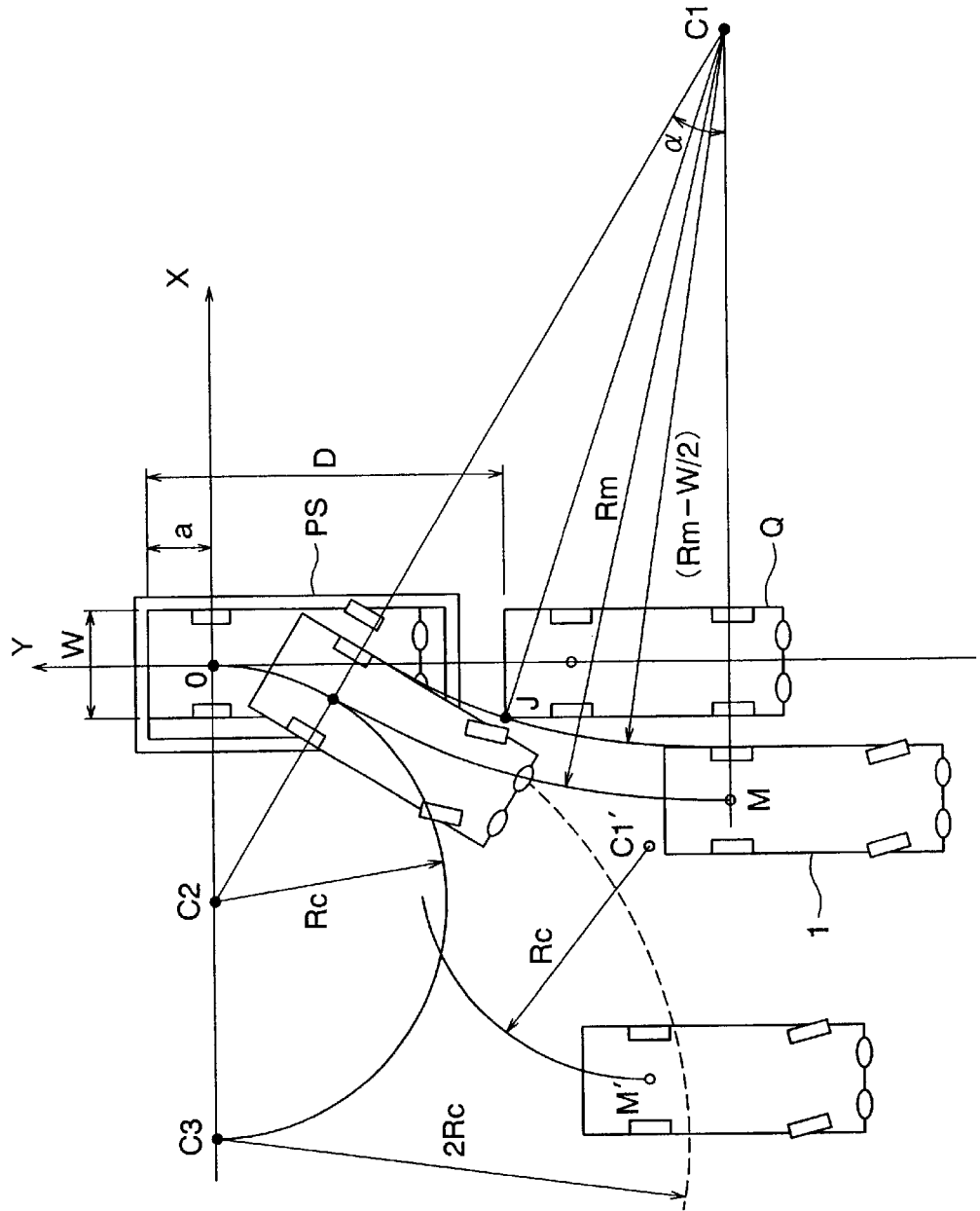
FIG. 5 is a schematic diagram showing how to obtain a parking guide enable region in accordance with the first embodiment.

As shown in FIG. 5, a point through which the vehicle 1 passes at the innermost at the time of the first turn is a vehicle inner side end portion on the rear axle, and the turning radius L1 is:

$$L1 = Rm - W/2.$$

It is assumed that the vehicle Q which has been parked is parked at the same size as that of the vehicle 1 and an interval D on the same Y-axis as that of the parking space PS. The farthest point J (Jx, Jy) of the vehicle Q from the turn center C1 is:

$$Jx = -w/2$$

$$Jy = -D + a$$

Also, since the coordinates C1 (C1x, C1y) of the turn center C1 are:

$$C1x = -Rc + (Rc + Rm) \cdot \cos\alpha \text{ and } C1y = -(Rc + Rm) \cdot \sin\alpha,$$

a length L2 of a line segment C1-J connecting the turn center C1 and the farthest point J is represented by the following expression.

$$L2 = [(Jx - C1x)^2 + (Jy - C1y)^2]^{1/2}$$

The condition for preventing the vehicle 1 from being interfered with the vehicle Q at the time of the first turn is L1 > L2. In this case, when a value Rm1 of the turning radius Rm which satisfies L1 = L2 is obtained, the following expressions are satisfied:

$$Rm1 = A/B$$

$$A = Rc \cdot (2 \cdot Rc - W) \cdot (1 - \cos\alpha) - (D - a) \cdot \{2 \cdot Rc \cdot \sin\alpha - (D - a)\}$$

$$B = 2 \cdot (D - a) \cdot \sin\alpha - 2 \cdot Rc \cdot (1 - \cos\alpha) - W \cdot (1 + \cos\alpha)$$

Figure 6:
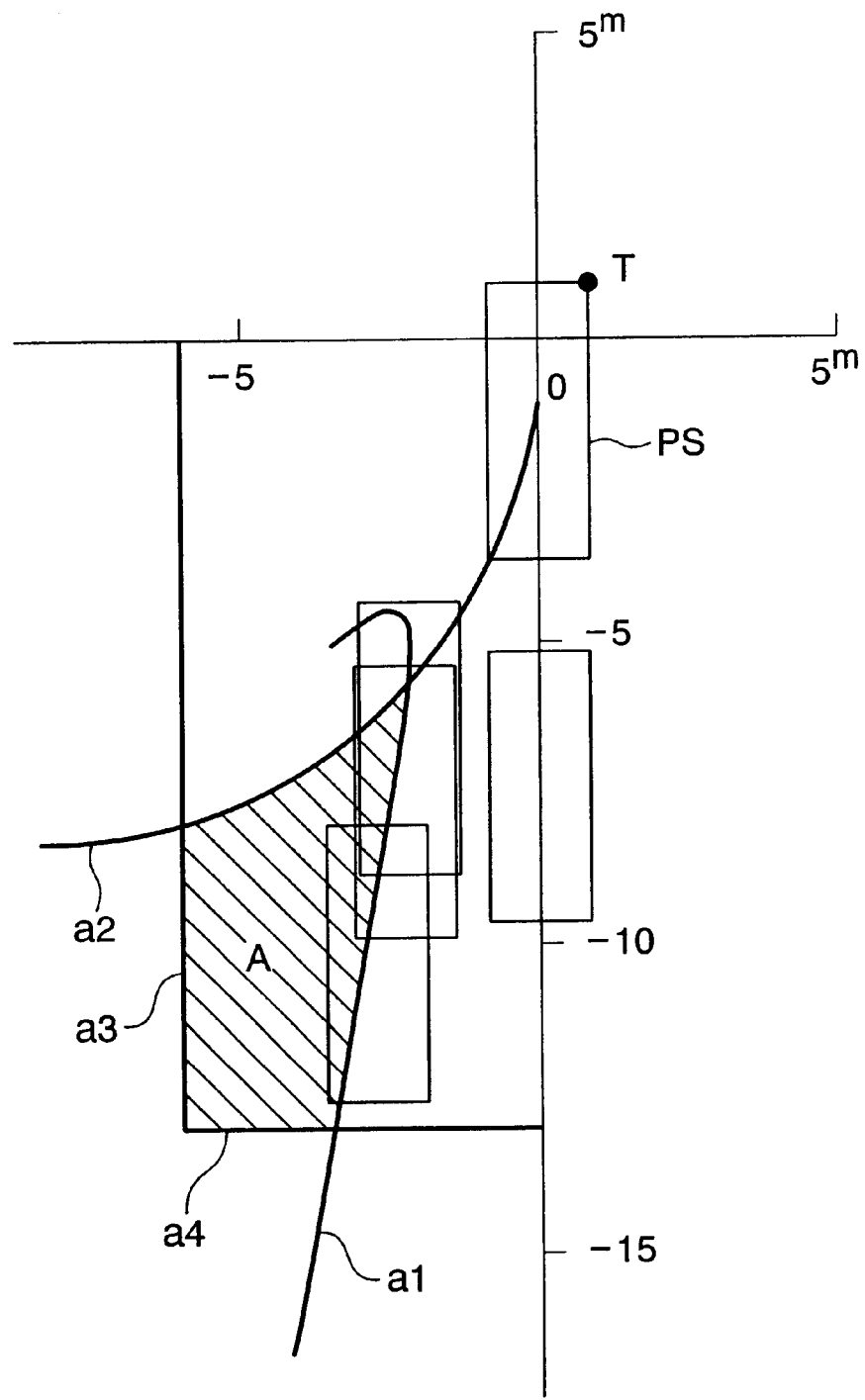
FIG. 6 is a schematic diagram showing the parking guide enable region in accordance with the first embodiment.

The coordinates M (Mx, My) of the vehicle position M is:

$$Mx = -(Rc + Rm1) \cdot (1 - \cos\alpha) - d$$

$$My = -(Rc + Rm1) \cdot \sin\alpha$$

where d is a margin of an interval between the vehicle 1 and the vehicle Q which has been parked. Assuming that D is 6 m, d is 0.5 m, a specific minimum turning radius Rc of the vehicle 1 is given, and a point M is plotted, a curve a1 shown in FIG. 6 is obtained. In FIG. 6, if the rear axle center of the center 1 of the vehicle 1 is positioned at a region which is left and below the curve a1, there is no case where the vehicle 1 interferes with the vehicle Q at the first turn.

2) The Avoidance of an Unable-to-Park Region

For example, even if the vehicle at the vehicle position M' shown in FIG. 5 turns with the minimum turning radius Rc, because its locus cannot come in contact with a second circle of the radius Rc with the point C2 as a center, the vehicle cannot park at the target parking space PS. If the vehicle has the rear axle center at the exterior of a circle having a radius 2Rc with a point C3 (−2Rc, 0), which is apart from the origin O by 2Rc in the −X-axial direction, as a center, the first turn circle can be drawn so as to be in contact with the second turn circle so that the vehicle may park at the target parking space PS.

If the circle having the radius 2RC with the point C3 (−2Rc, 0) as a center is drawn in FIG. 6 by using the specific minimum turning radius Rc of the vehicle 1 as in the case of (1), the curve a2 is obtained. The vehicle whose rear axle center is positioned in a region below the curve a2 can park at the target parking space PS.

3) The Limit of the Remote Distance in the X-direction

For example, it is assumed that the vehicle at a position apart from the origin O which is the target parking position by 6 m in the −X-axial direction is the farthest in the X-direction. In order that the vehicle parks at the target parking space PS, it is necessary that the rear axle center of the vehicle is positioned at the right side of the straight line a3 of FIG. 6.

4) The Limit of the Remote Distance in the Y-direction

For example, it is assumed that the vehicle at a position apart from the origin O which is the target parking position by 13 m in the −Y-axial direction is the farthest in the Y-direction. In order that the vehicle parks at the target parking space PS, it is necessary that the rear axle center of the vehicle is positioned at the upper side of the straight line a4 of FIG. 6.

If the rear axle center of the vehicle is positioned within a region A indicated by oblique lines in FIG. 6 which satisfies the above four conditions 1) to 4), the in-line parking guide according to the present invention can be appropriately made.

Figure 7:
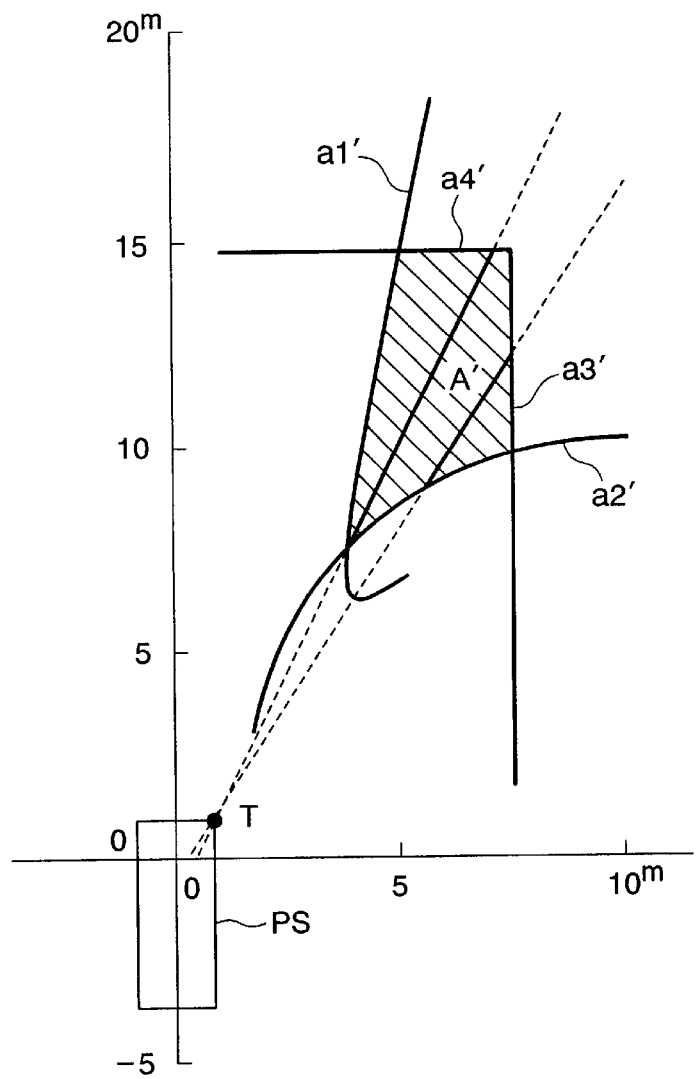
FIG. 7 is a schematic diagram showing a region of the existence of a parking target point where a vehicle can be parked on the screen in accordance with the first embodiment.

In this case, the in-line guide line is defined as a straight line including a point on the screen 19 when viewing the target point T of the target parking space PS from the vehicle positioned within the region A. FIG. 7 shows a region A' drawn such that the region A' and the region A are symmetrical with respect to the target point T. In FIG. 7, the curves a1', a2' and the straight lines a3', a4' are respectively obtained by drawing the curves a1, a2 and the straight lines a3, a4 shown in FIG. 6 at positions symmetrical with respect to the target point T. Assuming that the rear axle center of the vehicle 1 is the origin O, if the target point T exists within the region A' newly indicated, the parking guide can be appropriately made.

Figure 8:
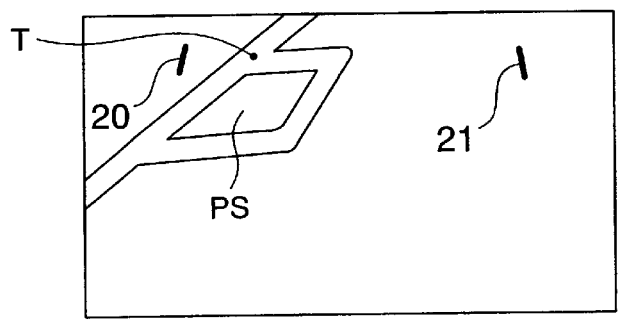
FIG. 8 is a schematic diagram showing the monitor screen representing the region of the existence of the parking target point where the vehicle can be parked in accordance with the first embodiment.

As described above, in the vehicle backward movement assisting apparatus in accordance with the first embodiment, the in-line guide line is drawn on the screen 19 on the basis of the value of the angle α set by the manipulation of the seesaw switch 12. In drawing the straight line L as a reference of the in-line guide line, only a line segment portion which exists within the region A' among the entire line L is displayed as the in-line guide line as shown in FIG. 7. With this arrangement, if the in-line guide line is superimposed on the target point T on the screen 19, it is found that in-line parking can be appropriately performed from the vehicle position in accordance with the in-line parking guide of the present invention. As is apparent from FIG. 7, the length of the in-line guide line drawn on the screen 19 is different depending on the angle of the straight line L, and for example, the in-line guide lines 20 and 21 are displayed so as to be shorter as shown in FIG. 8. In the case where the in-line guide lines 20 and 21 are not superimposed on the target point T even if the seesaw switch 12 is manipulated, it means that it is difficult to conduct the in-line parking from that vehicle position.

Second Embodiment

Figure 9A:
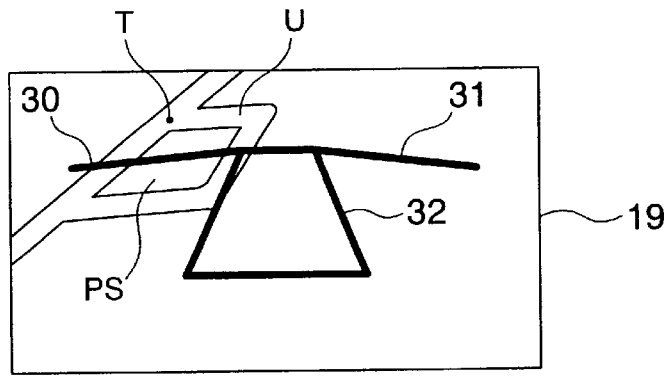
FIGS. 9A to 9D are views schematically showing, in a stepwise manner, a monitor screen when a vehicle is parked in line in accordance with a second embodiment.

The second embodiment is that a pair of right and left in-line guide lines which are in parallel with the rear end line of the parking space PS are employed as shown in FIG. 9A, instead of the pair of in-line guide lines 20 and 21 having a certain angle with respect to the parking space PS. The structure of the vehicle backward movement assisting apparatus is identical with that of the first embodiment shown in FIG. 2.

Figure 9B:
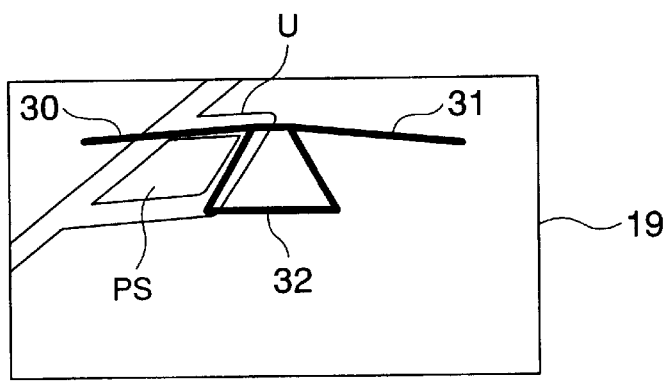

A CPU 13 operates on the basis of a control program stored in a ROM 14, and upon detection of entering a in-line parking mode by changing over the shift lever 5 to the backward position by the rear position switch 10, the CPU 13 produces display data in a given period for displaying a pair of in-line guide lines 30 and 31 disposed symmetrically at the right and left sides within the screen 19 of the monitor 4 and a rectangular vehicle space mark 32 disposed between those in-line guide lines 30 and 31 so as to be superimposed on an image of the camera 2, as shown in FIG. 9A. As shown in FIG. 9B, those in-line guide lines 30, 31 and the vehicle space mark 32 are movable vertically within the screen 19 of the monitor 4 by the manipulation of the seesaw switch 12 disposed in the driver's seat.

Figure 9C:
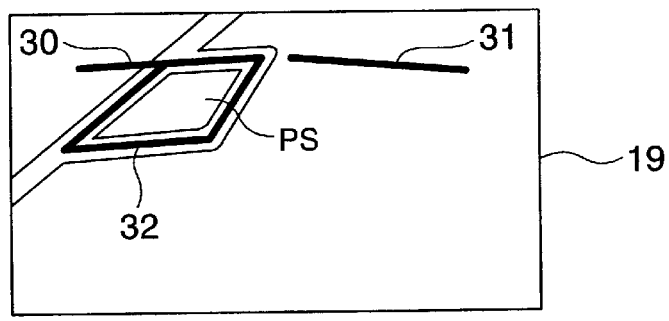

In addition, the CPU 13 displays the vehicle space mark 32 along one of the in-line guide lines 30 and 31 on the screen 19 of the monitor 4 in accordance with the steering angle θ of the steering wheel 7 on the basis of an output signal of the steering angle sensor 11 while moving the vehicle space mark 32. For example, if the steering wheel 7 is turned to the left, the vehicle space mark 32 is moved leftward along the in-line guide line 30 at the left side of the screen as shown in FIG. 9C, whereas if the steering wheel 7 is turned to the right, the vehicle space mark 32 is moved rightward along the in-line guide line 31 at the right side of the screen.

Figure 10:
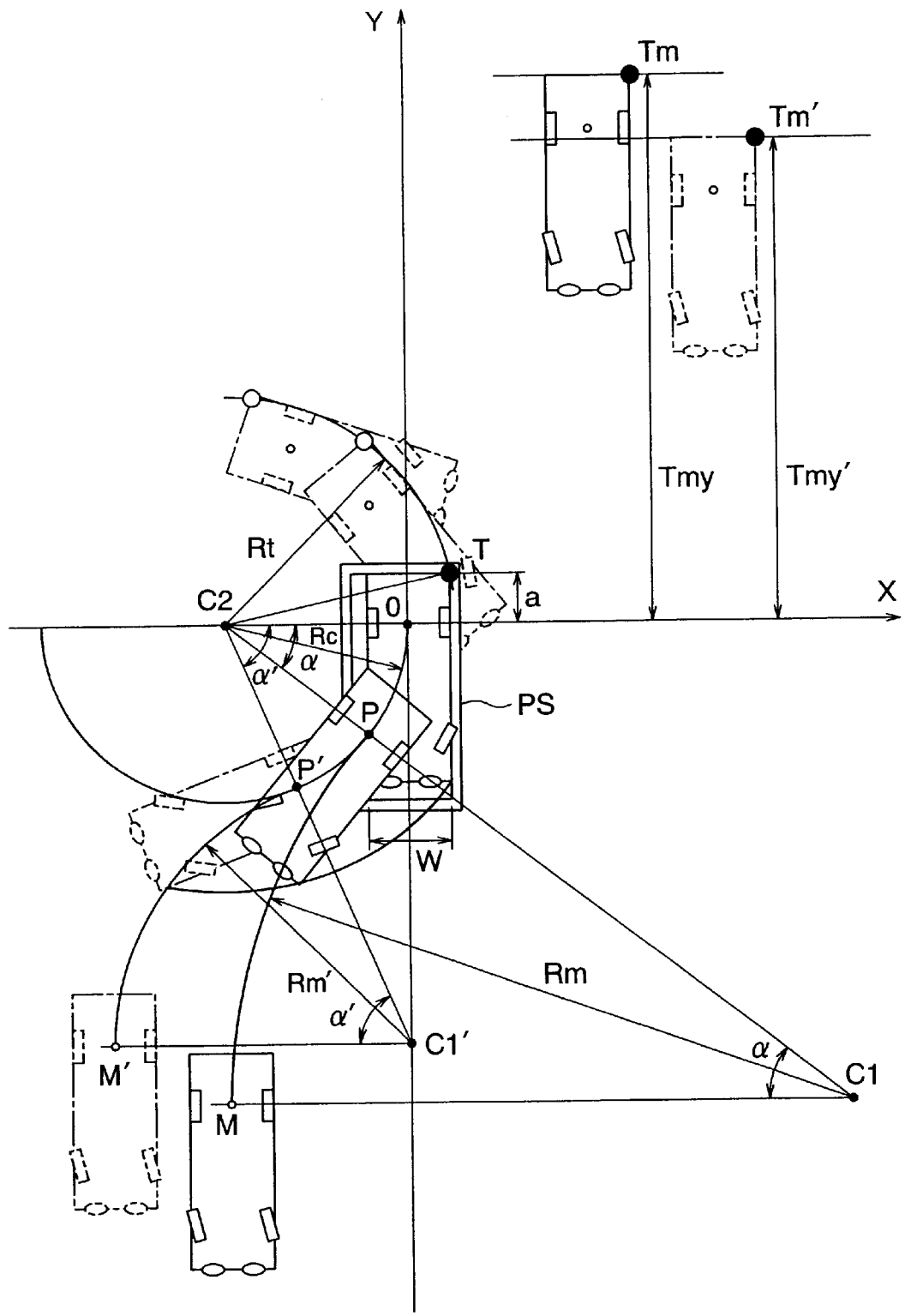
FIG. 10 is a diagram showing a method of drawing a guide display in accordance with the second embodiment.

A method of drawing the in-line guide lines 30 and 31 and the vehicle space mark 32 will be described with reference to FIG. 10. The origin O, the X-axis and the Y-axis are taken as in FIG. 4 showing the first embodiment. On the screen 19, when the in-line guide lines 30 and 31 are moved vertically by the manipulation of the seesaw switch 12 and superimposed on the rear end line of the parking space, the Y coordinate Tmy at a point Tm corresponding to the target point T of the parking space PS when the vehicle 1 at the vehicle position M is at the origin, that is, when the vehicle 1 is moved in parallel with the parking space PS, is obtained.

The Y coordinate My of the rear axle center of the vehicle 1 which is at the vehicle position M is represented from Tmy as follows:

$$My = Tmy - a$$

Assuming that K1, K2 and K3 are known coefficients, the radius R m of the first turn from the vehicle position M to the vehicle position P is obtained as follows through the steering angle θ of the steering wheel 7.

$$Rm = B/\tan(K1 \cdot \theta^2 + K2 \cdot \theta + K3)$$

[B: a known coefficient]

Further, from a relationship of $\sin\alpha = My/(Rc+Rm)$, the angle α is obtained. Then, the X coordinate Tmx at the point Tm is obtained from the following the expression:

$$Tmx = (Rc+Rm) \cdot (1-\cos\alpha) + W/2,$$

and the vehicle space mark 32 can be drawn at a position corresponding to the steering angle θ with the point Tm (Tmx, Tmy) as a rear end.

On the screen 19, the steering angle θ is changed in accordance with the manipulation of the steering wheel 7, as a result of which the vehicle space mark 32 is moved along the in-line guide lines 30 and 31 and then superimposed on the parking space PS, to thereby obtain an appropriate steering angle θ corresponding to the vehicle position M.

The eye mark 23 is drawn in completely the same manner as that of the first embodiment.

Then, the operation of the vehicle backward movement assisting apparatus at the time of in-line parking will be described. First, when the driver manipulates the shift lever 5 to a backward position at the vehicle position M which is in parallel with the road side as shown in FIG. 10, the image processing unit 8 displays a pair of in-line guide lines 30 and 31 laterally symmetrical with each other and the vehicle space mark 32 disposed between those in-line guide lines 30 and 31 so as to be superimposed on the image of the camera 2 within the screen 19 of the monitor 4 on the basis of a detection signal from the rear position switch 10.

In this case, on the screen 19, a rear end line U of the parking space PS is not yet superimposed on the in-line guide line 30 for the left side rear parking.

When the driver manipulates the seesaw switch 12, the in-line guide lines 30, 31 and the vehicle space mark 32 move vertically on the screen 19, and as shown in FIG. 9B, when the in-line guide line 30 is superimposed on the rear end line U of the parking space PS, the manipulation of the seesaw switch 12 is completed.

When the steering wheel 7 is turned to the left, the vehicle space mark 32 gradually moves toward the left side along the in-line guide line 30 in accordance with the steering amount of the steering wheel 7. Then, as shown in FIG. 9C, when the vehicle space mark 32 is superimposed on the parking space PS, the vehicle 1 is moved backward while the steering angle θ of the steering wheel 7 is retained. As a result, the vehicle 1 is turned with the radius of Rm. In this situation, the driver can move back the vehicle 1 while ensuring the safety of the periphery of the vehicle with his eyes being averted from the screen 19.

Figure 9D:
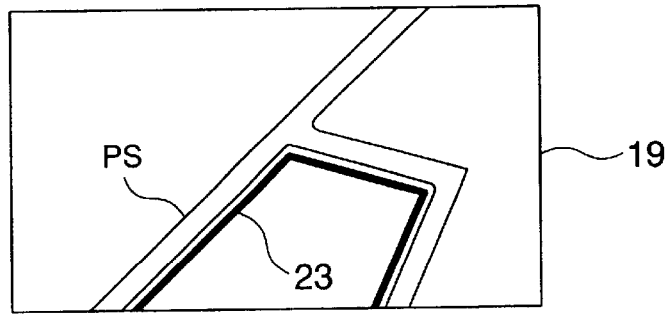

When the first turn of from the vehicle position M toward the vehicle position P starts, the CPU 13 completes the display of the in-line guide lines 30 and 31 and the vehicle space mark 32, and instead displays the eye mark 23 so as to be superimposed on the image of the camera 2. With the backward movement of the vehicle 1, the parking space PS gradually approaches the eye mark 23 on the screen 19. Then, as shown in FIG. 9D, when the parking space PS is superimposed on the eye mark 23, it is judged that the vehicle 1 reaches the vehicle position P, and the vehicle 1 is stopped.

Then, the steering angle of the steering wheel 7 is made maximum in the counter direction where the vehicle 1 is kept stopped, and in this state, the vehicle 1 is moved backward. In this state, the driver can move the vehicle 1 backward while ensuring the safety of the periphery of the vehicle 1 with his eyes being averted from the screen 19. As a result, the vehicle 1 appropriately enters the parking space PS, and the driver recognizes a gap between the vehicle and a rear substance, or when the side portion of the vehicle 1 becomes in parallel with a road side, the driver stops the vehicle 1 and completes the in-line parking.

As described above, in the second embodiment, the in-line guide lines 30 and 31 are superimposed on the rear end line U of the parking space PS on the screen 19 by the manipulation of the seesaw switch 12 in a state where the vehicle 1 is stopped at the vehicle position M which is in parallel with the road side, and the vehicle space mark 32 is superimposed on the parking space PS by the manipulation of the steering wheel 7, to thereby obtain the Y-coordinate Tmy of the point Tm, the turning angle α, the turning radius Rm and the vehicle position P of the first turning. For example, in FIG. 10, in the case where the vehicle 1 is stopped at the vehicle position M' which is in parallel with the road side, the Y-coordinate Tmy' of the point Tm', the turning angle α', the turning radius Rm', and the vehicle position P' are obtained in the same manner, and the in-line parking at the parking space PS can be conducted by the same manipulation.

Figure 11:
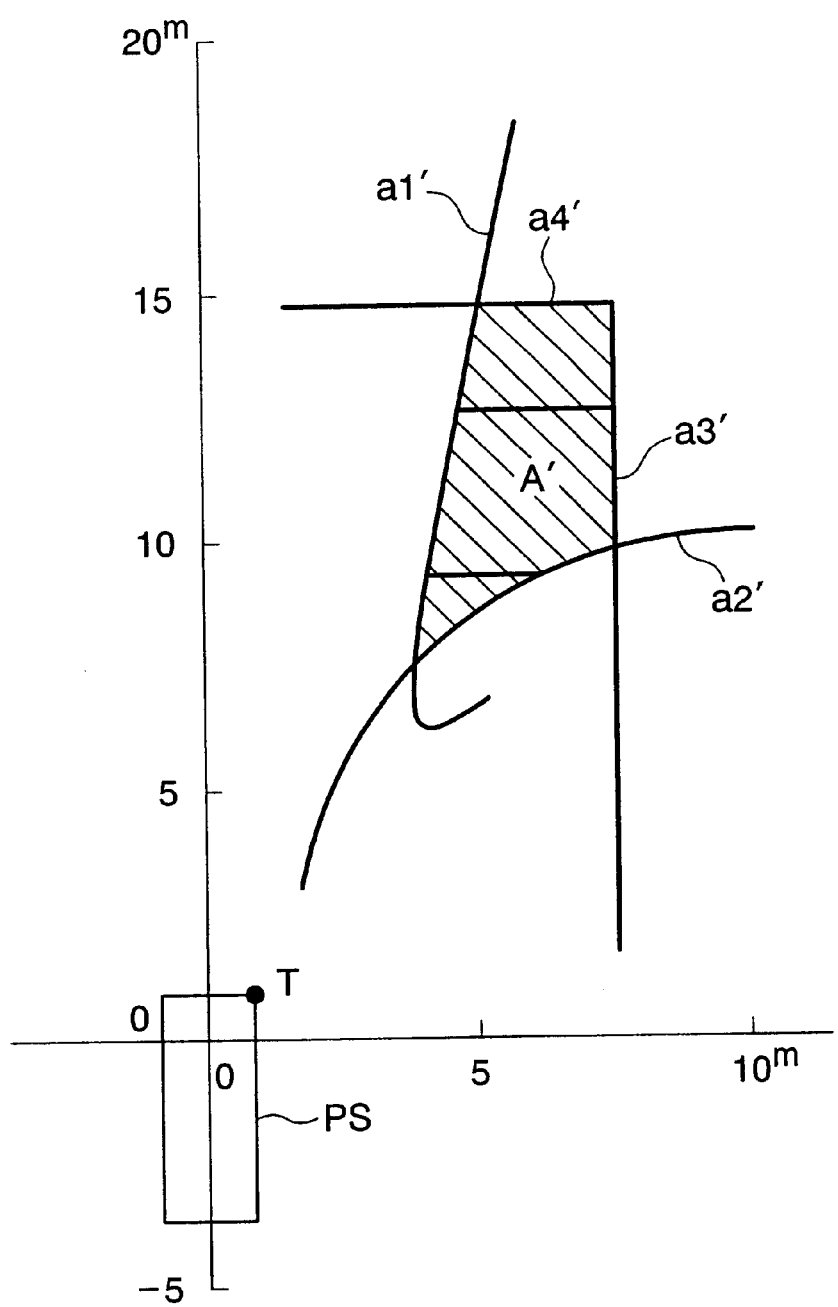
FIG. 11 is a schematic diagram showing a region of the existence of a parking target point where the vehicle can be parked on the screen in accordance with the second embodiment.

Similar to the first embodiment, in the second embodiment, the initial parking region where the vehicle can be parked which satisfies the above four conditions 1) to 4) at the same time can be set. The region A' is shown in FIG. 11 as in FIG. 7. The in-line guide line which is in parallel with the rear end line U of the parking space PS is drawn on the screen 19 on the basis of the value of Tmy set by the manipulation of the seesaw switch 12, and only a line segment portion which exists within the region A' is displayed as the in-line guide line as shown in FIG. 11. With this arrangement, if the in-line guide line is superimposed on the rear end line U of the parking space PS on the screen 19, if the in-line guide line reaches the target point T, it is found that in-line parking can be appropriately performed from the vehicle position in accordance with the in-line parking guide of the present invention.

Figure 12A:
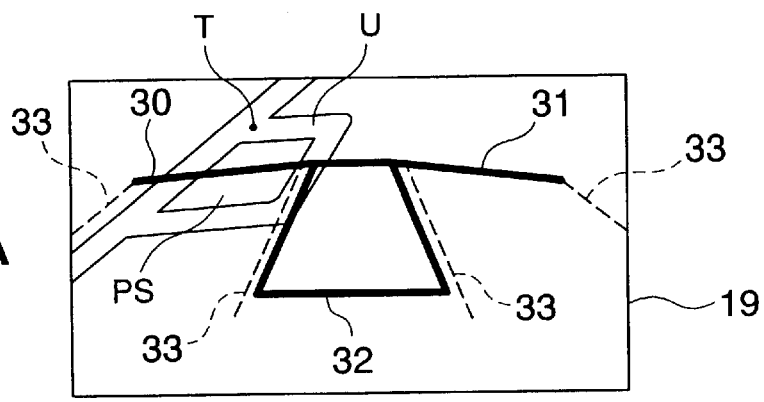
FIGS. 12A to 12C are views schematically showing, in a stepwise manner, the monitor screen representing the region of the existence of the parking target point where the vehicle can be parked in accordance with the second embodiment.
Figure 12B:
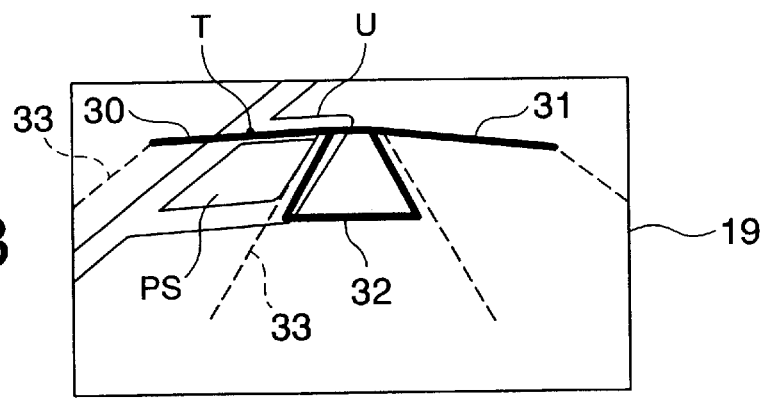
Figure 12C:
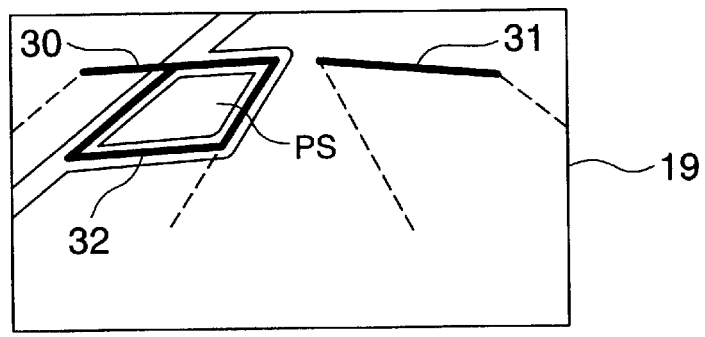

As shown in FIG. 12A, the in-line guide lines 30 and 31 corresponding to the line segment portion within the region A' are drawn, and the able-to-park area guide line 33 is also drawn from both ends of the respective in-line guide lines in parallel with the road side and toward the lower portion of the screen 19. As a result, as shown in FIG. 12B, when the in-line guide line 30 is superimposed on the rear end line U of the parking space PS, it can be readily understood that the in-line guide line 30 extends over to the target point T. In this state, the vehicle space mark 32 may be superimposed on the parking space PS by turning the steering wheel 7 leftward as shown in FIG. 12C.

Conversely, in the case where the in-line guide lines 30 and 31 are not positioned at the target point T, it means that it is difficult to conduct the in-line parking from that vehicle position.

Third Embodiment

The third embodiment shows that the in-line parking can be readily parked even in the case where the stop position of the vehicle 1 is inclined with respect to the parking space PS which is a target in the second embodiment using the in-line guide line which is in parallel with the rear end line of the parking space PS.

The structure of the vehicle backward movement assisting apparatus in accordance with the third embodiment is shown in FIG. 13. In the device shown in FIG. 2, the vehicle backward movement assisting apparatus further includes a second seesaw switch 18 for inclining the in-line guide lines 30, 31 and the vehicle space mark 32 in the driver's seat, and the second seesaw switch 18 is connected to the image processing unit 8.

Figure 14A:
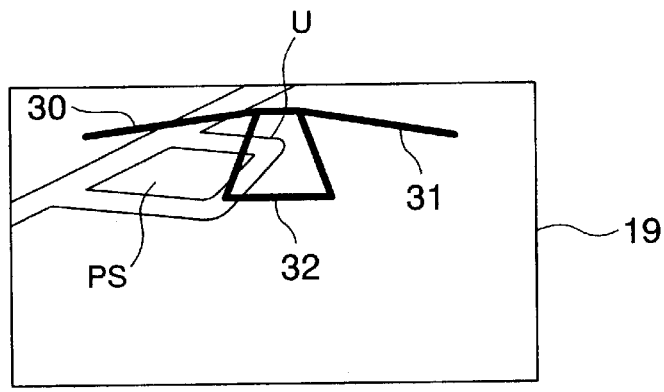
FIGS. 14A to 14D are views schematically showing, in a stepwise manner, a monitor screen when a vehicle is parked in line in accordance with the third embodiment.
Figure 14B:
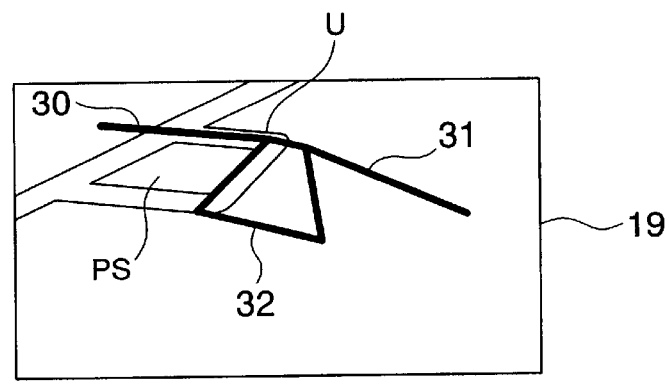

A CPU 13 operates on the basis of control program stored in a ROM 14, and upon detection of entering an in-line parking mode by changing over the shift lever 5 to the backward position by the rear position switch 10, the CPU 13 produces display data in a given period for displaying a pair of in-line guide lines 30 and 31 disposed symmetrically at the right and left sides within the screen 19 of the monitor 4 and a rectangular vehicle space mark 32 disposed between those in-line guide lines 30 and 31 so as to be superimposed on an image of the camera 2, as shown in FIG. 14A. Those in-line guide lines 30, 31 and the vehicle space mark 32 are movable vertically within the screen 19 of the monitor 4 by the manipulation of the seesaw switch 12 disposed in the driver's seat and also inclinable within the screen 19 by the manipulation of the seesaw switch 18, as shown in FIG. 14B.

Figure 14C:
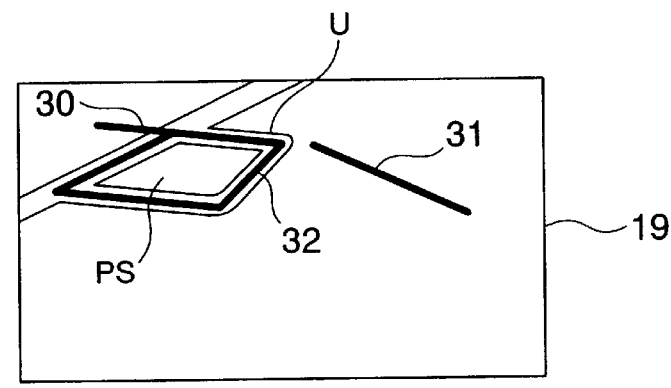

In addition, the CPU 13 displays the vehicle space mark 32 along one of the in-line guide lines 30 and 31 on the screen 19 of the monitor 4 in accordance with the steering angle θ of the steering wheel 7 on the basis of an output signal of the steering angle sensor 11 while moving the vehicle space mark 32. For example, if the steering wheel 7 is turned to the left, the vehicle space mark 32 is moved leftward along the in-line guide line 30 at the left side of the screen as shown in FIG. 14C, whereas if the steering wheel 7 is turned to the right, the vehicle space mark 32 is moved rightward along the in-line guide line 31 at the right side of the screen.

A method of drawing the in-line guide lines 30 and 31 and the vehicle space mark 32 will be described with reference to FIG. 15. The center of the rear axle of the vehicle 1 that is stopped obliquely with respect to the parking space PS is set as an origin O, a Y-axis is taken just at the rear of the vehicle 1 at that time, and an X-axis is taken at a right angle with respect to the Y-axis. First, as in the second embodiment, the vehicle space mark 32 is displayed just at the rear of the vehicle 1, and the in-line guide lines 30 and 31 are displayed at the right and left of the rear end of the vehicle space mark 32.

Then, the in-line guide lines 30 and 31 are moved vertically by the manipulation of the seesaw switch 12 and also inclined by the manipulation of the seesaw switch 18 in such a manner that the in-line guide lines 30 and 31 are superimposed on the rear end line U of the parking space PS. As a result, there are obtained the Y-coordinate GPy of the rear axle center GP at the vehicle space mark 32 displayed just at the rear of the vehicle 1, and an inclination φ of the vehicle 1 with respect to the parking space PS.

The vehicle space mark 32 just at the rear of the vehicle 1 is displayed with the inclination φ. In this case, the vehicle space mark 32 is inclined in the direction of the inclination φ, and a point representing the outer configuration of the vehicle space mark 32 is set as relative coordinates with respect to the rear axle center GP.

Figure 15:
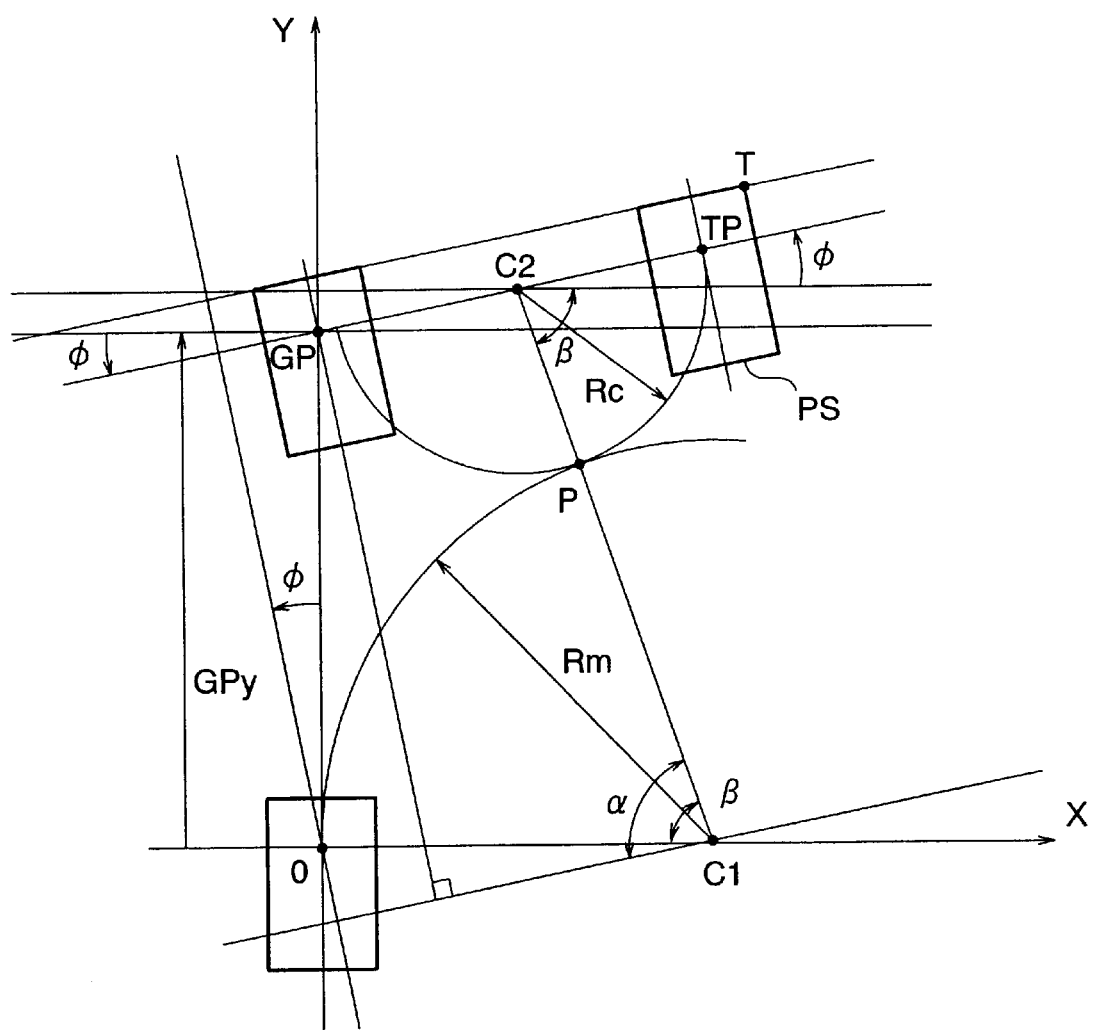
FIG. 15 is a diagram showing a method of drawing a guide display in accordance with the third embodiment.

In FIG. 15, assuming that the turning angle of the first turn of from the origin O to the vehicle position P is β, and the turning angle α of the first turn when the vehicle 1 is moved at a position which is in parallel with the parking space PS while the turning radius Rm of the first turn is maintained is α, the following expressions are satisfied.

$$\sin\alpha = (GPy \cdot \cos|\phi| + Rm \cdot \sin|\phi|)/(Rc + Rm)$$

$$\beta = \alpha - \phi$$

Therefore, the coordinates (TPx, TPy) of the rear axle center TP at the parking space PS in accordance with the steering amount of the steering wheel 7 are represented as follows:

$$Tpx=Rm-(Rc+Rm)\cdot\cos\beta+Rc\cdot\cos|\phi|$$

$$Tpy=(Rc+Rm)\cdot\sin\beta+Rc\cdot\sin|\phi|$$

A point representing the outer configuration of the vehicle space mark 32 is drawn with the point TP as a reference.

Also, the eye mark 23 is drawn at a position where the vehicle 1 which is appropriately parked at the parking space PS is rotated by the angle β in the direction of the origin O with the center C1 of the first turn as a center.

Then, the operation of the vehicle backward movement assisting apparatus at the time of the in-line parking will be described. First, when the driver manipulates the shift lever 5 to a backward position at a position inclined as shown by the origin O of FIG. 15, the image processing unit 8 displays a pair of in-line guide lines 30 and 31 laterally symmetrical with each other and the vehicle space mark 32 disposed between those in-line guide lines 30 and 31 so as to be superimposed on the image of the camera 2 within the screen 19 of the monitor 4 on the basis of a detection signal from the rear position switch 10.

The driver manipulates the seesaw switches 12 and 18 so that the in-line guide lines 30, 31 and the vehicle space mark 32 move vertically and are also inclined, and as shown in FIG. 14B, when the in-line guide line 30 is superimposed on the rear end line U of the parking space PS, the manipulation of the seesaw switches 12 and 18 is completed.

In this situation, when the steering wheel 7 is turned to the left, the vehicle space mark 32 gradually moves toward the left side along the in-line guide line 30 in accordance with the steering amount of the steering wheel 7. Then, as shown in FIG. 14C, when the vehicle space mark 32 is superimposed on the parking space PS, the vehicle 1 is moved backward while the steering angle θ of the steering wheel 7 is retained. As a result, the vehicle 1 is turned with the radius of Rm. In this situation, the driver can move backward the vehicle 1 while ensuring the safety of the periphery of the vehicle 1 with his eyes being averted from the screen 19.

Figure 14D:
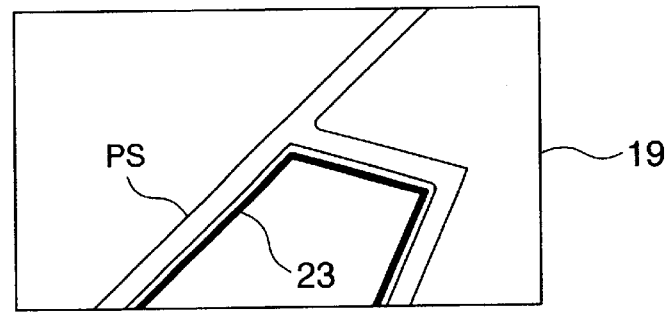

When the first turn starts, the CPU 13 completes the display of the in-line guide lines 30 and 31 and the vehicle space mark 32, and instead displays the eye mark 23 so as to be superimposed on the image of the camera 2. With the backward movement of the vehicle 1, the parking space PS gradually approaches the eye mark 23 on the screen 19. Then, as shown in FIG. 14D, when the parking space PS is superimposed on the eye mark 23, it is judged that the vehicle 1 reaches the vehicle position P, and the vehicle 1 is stopped.

Then, the steering angle of the steering wheel 7 is made maximum in the counter direction during a static turn, and in this state, the vehicle 1 is moved backward. In this case, the driver can move the vehicle 1 backward while ensuring the safety of the periphery of the vehicle 1 with his eyes being averted from the screen 19. As a result, the vehicle 1 appropriately enters the parking space PS, and the driver recognizes a gap between the vehicle and a rear substance, or when the side portion of the vehicle 1 becomes in parallel with a road side, the driver stops the vehicle 1 and completes the in-line parking.

As described above, in the third embodiment, the in-line guide lines 30 and 31 are superimposed on the rear end line U of the parking space PS on the screen 19 by the manipulation of the seesaw switches 12 and 18 even in a state where the vehicle 1 is stopped at the position which is inclined with respect to the parking space PS which is a target. In addition, the steering wheel 7 is steered so that the vehicle space mark 32 is superimposed on the parking space PS, thereby being capable of readily conducting the in-line parking at the parking space PS.

In the third embodiment, the initial parking region where the vehicle can be parked can be set as in the first and second embodiments.

Fourth Embodiment

Figure 16A:
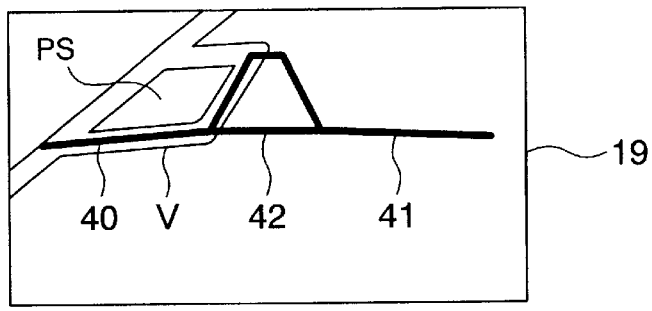
FIGS. 16A and 16B, 17A and 17B, 18A to 18C, and 19A to 19E are views schematically showing, in a stepwise manner, a monitor screen when a vehicle is parked in line in accordance with fourth, fifth, sixth and seventh embodiments, respectively.
Figure 16B:
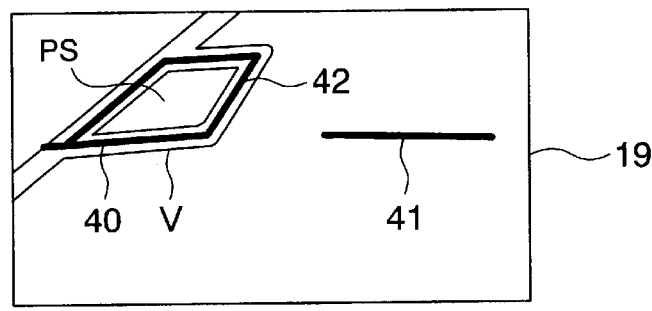

In the second and third embodiments, the in-line guide lines 30 and 31 are guided so as to be superimposed on the rear end line U of the parking space PS. However, the present invention is not limited to this structure. For example, as shown in FIG. 16A, the in-line guide lines 40 and 41 may be drawn at the right and left of the front end of the rectangular vehicle space mark 42 so that those in-line guide lines 40 and 41 are superimposed on the front end line V of the parking space PS. Thereafter, when the steering wheel 7 is turned, the vehicle space mark 42 gradually moves along the in-line guide line 40 or 41 in accordance with the steering amount of the steering wheel 7, and when the vehicle space mark 42 is superimposed on the parking space PS as shown in FIG. 16B, the vehicle 1 may be moved backward while the steering angle θ of the steering wheel 7 is retained.

Fifth Embodiment

Figure 17A:
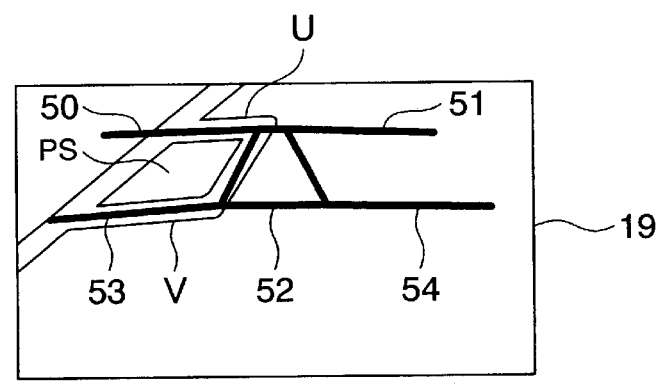
Figure 17B:
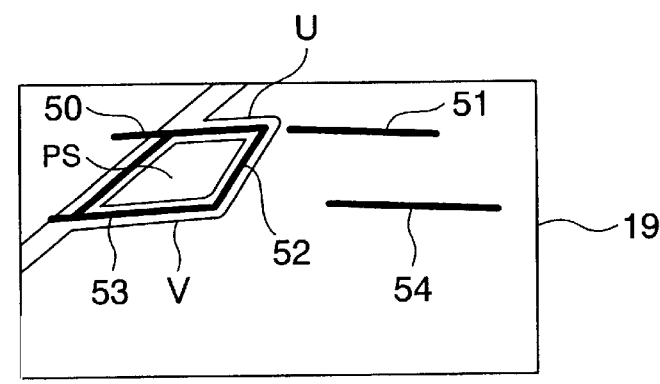

In the second and third embodiments, the in-line guide lines 30 and 31 are guided so as to be superimposed on the rear end line U of the parking space PS. However, as shown in FIG. 17A, in-line guide lines 50 and 51 may be drawn at the right and left of the rear end of a rectangular vehicle space mark 52 and also in-line guide lines 53 and 54 may be drawn at the right and left of the front end of the rectangular vehicle space mark 52 so that those in-line guide lines are superimposed on both of the rear end line U and the front end line V of the parking space PS. Thereafter, when the steering wheel 7 is turned, the vehicle space mark 52 gradually moves along the in-line guide lines 50 and 53 or 51 and 54 in accordance with the steering amount of the steering wheel 7, and when the vehicle space mark 52 is superimposed on the parking space PS as shown in FIG. 17B, the vehicle 1 may be moved backward while the steering angle θ of the steering wheel 7 is retained.

Sixth Embodiment

Figure 18A:
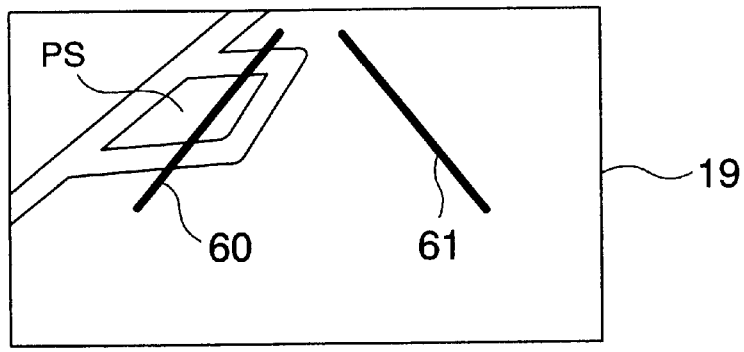
Figure 18B:
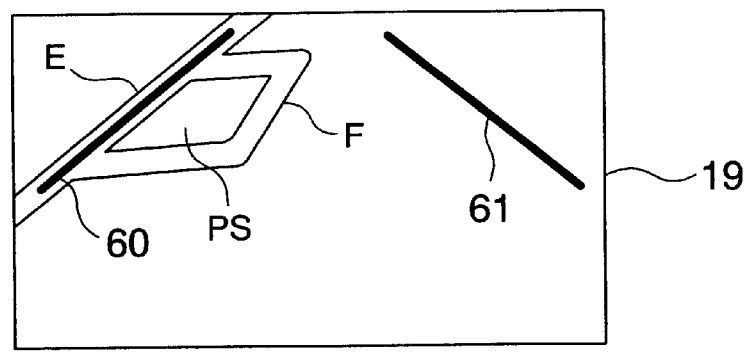
Figure 18C:
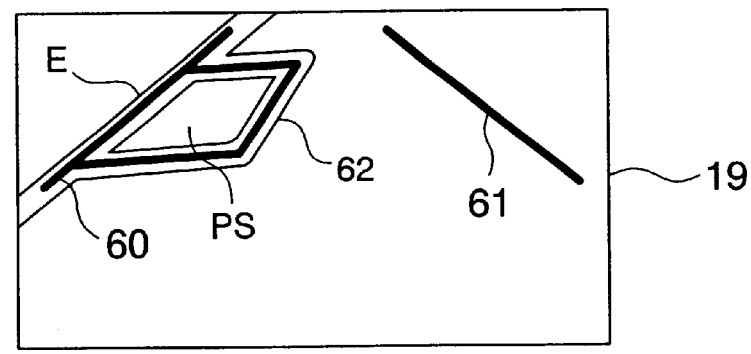

In the second to fifth embodiments, the in-line guide lines are guided so as to be superimposed on at least one of the rear end line U and the front end line V of the parking space PS. However, the present invention is not limited to those structures. As shown in FIG. 18A, a pair of right and left in-line guide lines 60 and 61 may be drawn in parallel with the road side, and the seesaw switch 12 may be manipulated so that those in-line guide lines 60 and 61 are moved at the right and left sides so as to be superimposed on a back side line E close to a shoulder of the parking space PS. Thereafter, when the steering wheel 7 is turned, a vehicle space mark 62 gradually moves along the in-line guide line 60 or 61 from the upper side toward the lower side in accordance with the steering amount of the steering wheel 7, and when the vehicle space mark 62 is superimposed on the parking space PS as shown in FIG. 18C, the vehicle 1 may be moved backward while the steering angle θ of the steering wheel 7 is retained.

The in-line guide lines 60 and 61 may be superimposed not on the back side line E of the parking space PS but on a side line F in front of the road. In addition, two right and left in-line guide lines which are in parallel with each other are drawn so that those in-line guide lines can be superimposed on both of the back side line E and the front side line F of the parking space PS at the same time.

Also, in the sixth embodiment, two seesaw switches are provided so that the in-line guide lines are moved at the right and left sides and inclined as in the third embodiment, the in-line parking can be readily conducted at the parking space PS even in a state where the vehicle 1 is stopped at a position inclined with respect to the parking space PS which is a target.

Seventh Embodiment

The seventh embodiment shows that in the third embodiment, in the case where the stop position of the vehicle 1 is inclined with respect to the parking space PS which is a target, the in-line guide line can be superimposed on the parking space PS with more accuracy.

Figure 19A:
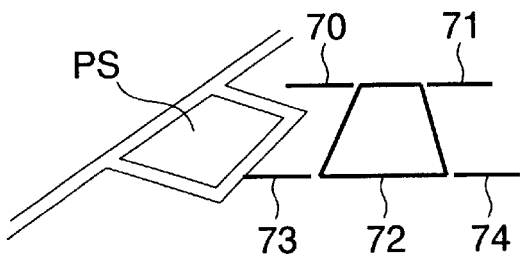

Upon detection of entering an in-line parking mode by changing over the shift lever 5 to the backward position by the rear position switch 10 or by the manipulation of the in-line parking switch not shown, the CPU 13 produces display data in a given period for displaying a rectangular vehicle space mark 72 disposed substantially in the center of the screen 19 of the monitor 4, in-line guide lines 70 and 71 extending toward the right and left sides in parallel with the widthwise direction of the vehicle from the rear end of the vehicle space mark 72, and in-line guide lines 73 and 74 extending toward the right and left sides in parallel with the widthwise direction of the vehicle from the front end of the vehicle space mark 72 so as to be superimposed on the image of the camera 2, as shown in FIG. 19A.

Figure 19B:
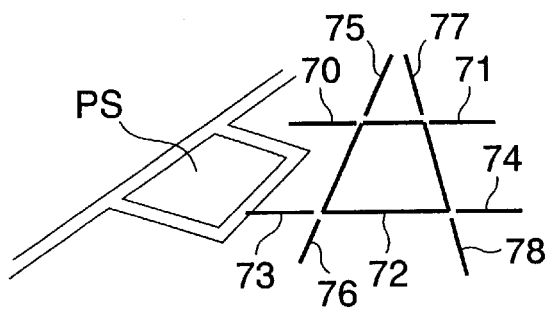

In addition, upon the manipulation of the seesaw switch 18 for inclination disposed in the driver s seat, the CPU 13 produces display data in a given period for displaying auxiliary lines 75 and 76 extending in parallel with the longitudinal direction of the vehicle from the left end of the vehicle space mark 72 and auxiliary lines 77 and 78 extending in parallel with the longitudinal direction of the vehicle from the right end of the vehicle space mark 72 so as to be superimposed on the image of the camera 2 on the screen 19 of the monitor 4, as shown in FIG. 19B.

Figure 19C:
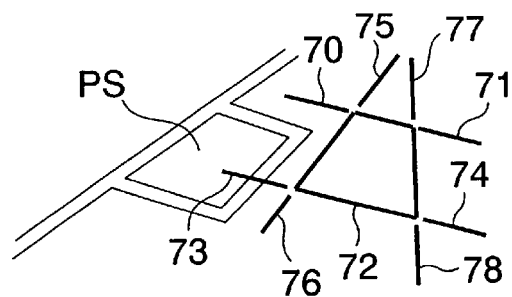

The vehicle space mark 72, the in-line guide lines 70, 71, 73 and 74 and the auxiliary lines 75 to 78 are moved vertically within the screen 19 of the monitor 4 by the manipulation of the seesaw switch 12 disposed in the driver's seat and also inclinable within the screen 19 by the manipulation of the seesaw switch 18 as shown in FIG. 19C.

In addition, the CPU 13 displays all of the vehicle space mark 72, the in-line guide lines 70, 71, 73 and 74 and the auxiliary lines 75 to 78 while they are moved along the in-line guide lines 70 and 73 or the in-line guide lines 71 and 74 in accordance with the steering angle θ of the steering wheel 7 at the time, on the basis of the output signal from the steering angle sensor 11. For example, when the steering wheel 7 is turned to the left, as shown in FIG. 19E, the vehicle space mark 72, the in-line guide lines 70, 71, 73 and 74 and the auxiliary lines 75 to 78 are moved toward the left side along the in-line guide lines 70 and 73 at the left side of the screen.

Then, the operation of the vehicle backward movement assisting apparatus at the time of the in-line parking will be described. First, when the driver manipulates the shift lever 5 to a backward position after stopping the vehicle 1 at a position inclined with respect to the parking space PS, the image processing unit 8 displays the vehicle space mark 72 and the in-line guide lines 70, 71, 73 and 74 so as to be superimposed on the image of the camera 2 within the screen 19 of the monitor 4 on the basis of a detection signal from the rear position switch 10, as shown in FIG. 19A.

Then, when the driver manipulates the seesaw switch 18 for inclination, the image processing unit 8 additionally displays the auxiliary lines 75 to 78 extending from the vehicle space mark 72 in the longitudinal direction of the vehicle as shown in FIG. 19B. The driver manipulates the seesaw switch 18 until the auxiliary lines 75 to 78 and the right and left lines of the vehicle space mark 72 become in parallel with the side line of the parking space as shown in FIG. 19C.

Figure 19D:
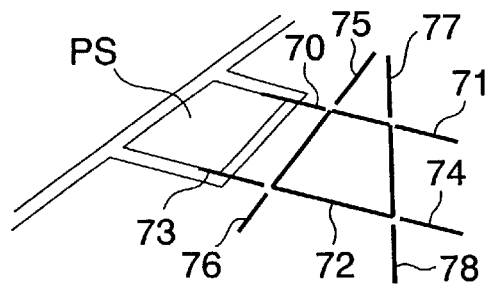
Figure 19E:
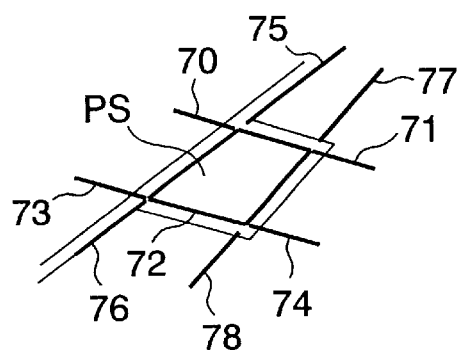

Then, the driver manipulates the seesaw switch 12 until the in-line guide lines 70, 71, 73 and 74 are superimposed on the rear end line and the front end line of the parking space PS as shown in FIG. 19D.

In this situation, after the steering wheel 7 is manipulated until the vehicle space mark 32 is superimposed on the parking space PS, the vehicle 1 is moved backward while the steering angle θ of the steering wheel 7 is retained. As a result, the first turn of the vehicle 1 is conducted, and thereafter the in-line parking is conducted in the same manner as that of the third embodiment. That is, when the first turn starts, the CPU 13 completes the display of the vehicle space mark 72, the in-line guide lines 70, 71, 73 and 74 and the auxiliary lines 75 to 78, and instead display the eye mark 23 so as to be superimposed on the image of the camera 2 as shown in FIG. 14D, and when the parking space PS is superimposed on the eye mark 23, the driver judges that the vehicle 1 reaches the vehicle position P, and stops the vehicle 1. Then, the steering angle of the steering wheel 7 is made maximum in the counter direction during a static turn, and in this state, the vehicle 1 is moved backward to thus complete the in-line parking.

As described above, in the seventh embodiment, since the auxiliary lines 75 to 78 extending in parallel with the longitudinal direction of the vehicle from the vehicle space mark 72 is drawn, even if the vehicle space mark 72 is at a position displaced from the parking space PS, the driver can readily grasp to what degree the vehicle 1 is inclined with respect to the parking space mark 72, to thereby facilitate the manipulation of the seesaw switch 18. Also, even in the case where a frame line does not exist at the parking space PS, the manipulation amount of the seesaw switch 18 can be readily determined by making the auxiliary lines 75 to 78 coincide with front and rear tires of the parked vehicle or the like. As a result, the in-line parking at the parking space PS can be conducted with high accuracy.

Since the auxiliary lines 75 to 78 are displayed on the screen 19 of the monitor 4 when the driver manipulates the seesaw switch 18, for example, in the case where the vehicle 1 is parked without any inclination of the in-line guide lines 70, 71, 73 and 74 because the vehicle 1 is in parallel with the parking space PS, the auxiliary lines 75 to 78 are not displayed, and the back image on the screen 19 is readily viewed.

If the auxiliary lines 75 to 78 are different in color from the vehicle space mark 72, the display on the screen 19 is more readily viewed, and the manipulation becomes easy.

In the seventh embodiment, the initial parking region where the vehicle can be parked can be set as in the first and second embodiments.

In the above-described embodiments 1 to 7, an appearance of the in-line parking at the parking space at the left and rear side is shown. Similarly, the in-line parking at the right and rear side can be conducted.

In the above-described embodiments 1 to 7, the movement of the in-line guide lines is conducted by the seesaw switches 12 an 18. However, the present invention is not limited to this structure. For example, the in-line guide lines may be moved and displayed by a touch panel disposed on the screen of the monitor 4.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A vehicle backward movement assisting apparatus for in-line parking comprising:
    a camera for picking up an image of the rear of a vehicle;
    a monitor disposed in a driver's seat of the vehicle;
    an in-line guide line movement switch disposed in the driver's seat of the vehicle;
    a steering angle sensor for detecting a steering angle of a steering wheel; and
    display control means for, when the vehicle runs backward, displaying on said monitor an image obtained by said camera and for displaying a guide display for assisting the drive of the vehicle in the in-line parking operation on a screen of said monitor in a superimposing manner,
    the guide display including:
        at least one in-line guide line displayed movably on the screen of said monitor in accordance with the manipulation of said in-line guide line movement switch;
        a vehicle space mark displayed movably along the in-line guide line of the screen of said monitor in accordance with the steering angle of the steering wheel detected by said steering angle sensor; and
        an eye mark fixedly displayed at a given position of the screen of said monitor for guiding an opposite turn point of the steering wheel.

2. The vehicle backward movement assisting apparatus as claimed in claim 1, wherein said in-line guide line movement switch is manipulated at a stop position of the vehicle so that the in-line guide line is superimposed on a target related to a parking space within an image of said camera on the screen of said monitor, the vehicle space mark is superimposed on the parking space by turning the steering wheel, and at that position, the vehicle is moved backward while the steering wheel is held, and when the eye mark is superimposed on the parking space, the vehicle is stopped, and the steering angle of the steering wheel is made maximum in a counter direction where the vehicle is kept stopped and the vehicle is moved backward to thereby park the vehicle suitably and in line at the parking space.

3. The vehicle backward movement assisting apparatus as claimed in claim 2, wherein said in-line guide line movement switch comprises: a first switch for moving the in-line guide line in a vertical direction or in a lateral direction; and a second switch for rotating the in-line guide line, when the vehicle stops with an inclination with respect to the parking space, the in-line guide line being superimposed on the target related to the parking space by the manipulation of said first and second switches.

4. The vehicle backward movement assisting apparatus as claimed in claim 3, wherein said display control means draws a line segment extending in parallel with the widthwise direction of the vehicle from the vehicle space mark as the in-line guide line, and draws a line segment extending in parallel with the longitudinal direction of the vehicle as an auxiliary line from the vehicle space mark,
    the vehicle space mark, the in-line guide line and the auxiliary line being rotated together by the manipulation of said second switch.

5. The vehicle backward movement assisting apparatus as claimed in claim 4, wherein the auxiliary line has a color different from the vehicle space mark.

6. The vehicle backward movement assisting apparatus as claimed in claim 2, wherein said display control means calculates a region of the existence of a parking target point where the vehicle can be parked from the stop position on the basis of a positional relationship between the vehicle and the parking space, and draws a line segment of a length corresponding to the region as the in-line guide line.

7. The vehicle backward movement assisting apparatus as claimed in claim 1, wherein said display control means draws a line segment inclined with respect to the vehicle as the in-line guide line,
    the in-line guide line being moved at the right and left sides on the screen of said monitor by the manipulation of said in-line guide line movement switch so as to be superimposed on the corner of a frame of the parking space which is the target.

8. The vehicle backward movement assisting apparatus as claimed in claim 1, wherein said display control means draws a line segment extending in parallel with the widthwise direction of the vehicle as a in-line guide line,
    the in-line guide line being moved vertically on the screen of said monitor by the manipulation of said in-line guide line movement switch so as to be superimposed on at least one of a rear end line and a front end line of the parking space which is the target.

9. The vehicle backward movement assisting apparatus as claimed in claim 1, wherein said display control means draws a line segment extending in parallel with the longitudinal direction of the vehicle as an in-line guide line,
    the in-line guide line being moved at the right and left side on the screen of said monitor by the manipulation of said in-line guide line movement switch so as to be superimposed on at least one of a back side line closer to a shoulder of the road and a front side line closer to a road of the parking space which is the target.

10. The vehicle backward movement assisting apparatus as claimed in claim 1, wherein said in-line guide line movement switch comprises a seesaw switch.

11. The vehicle backward movement assisting apparatus as claimed in claim 1, wherein said vehicle space mark is rectangular.

12. The vehicle backward movement assisting apparatus as claimed in claim 1, wherein said display control means draws one in-line guide line for left parking and the other in-line guide line for right parking.

* * * * *